(12) United States Patent
Gozani et al.

(10) Patent No.: US 8,963,094 B2
(45) Date of Patent: Feb. 24, 2015

(54) COMPOSITE GAMMA-NEUTRON DETECTION SYSTEM

(71) Applicant: Rapiscan Systems, Inc., Torrance, CA (US)

(72) Inventors: Tsahi Gozani, Palo Alto, CA (US); Michael Joseph King, Mountain View, CA (US); Donald Bennett Hilliard, El Granada, CA (US); Joseph Bendahan, San Jose, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 118 days.

(21) Appl. No.: 13/753,458

(22) Filed: Jan. 29, 2013

(65) Prior Publication Data

US 2014/0042330 A1 Feb. 13, 2014

Related U.S. Application Data

(63) Continuation-in-part of application No. 12/976,861, filed on Dec. 22, 2010, now Pat. No. 8,389,941, which is a continuation-in-part of application No. 12/997,251, filed as application No.
(Continued)

(30) Foreign Application Priority Data

Jun. 11, 2008 (GB) .................................. 0810638.7

(51) Int. Cl.
*G01T 1/164* (2006.01)
(52) U.S. Cl.
USPC .................................................... 250/363.02

(58) Field of Classification Search
CPC .............. G01T 3/06; G01T 1/20; H01L 31/15
USPC .............. 250/363.01–363.1, 390.01–390.12, 250/69.1–269.8
See application file for complete search history.

(56) References Cited

U.S. PATENT DOCUMENTS 2,831,123 A 4/1958 Daly
2,971,433 A 2/1961 Akin
(Continued)

FOREIGN PATENT DOCUMENTS

EP 0077018 4/1983
EP 176314 4/1986
(Continued)

OTHER PUBLICATIONS

"Mobile X-Ray Inspection Systems", Internet Citation, Feb. 12, 2007, pp. 1-2, URL:http://web.archive.org/web/20070212000928.
(Continued)

*Primary Examiner* — Kiho Kim
(74) *Attorney, Agent, or Firm* — Novel IP

(57) ABSTRACT

The present invention provides a gamma-neutron detector based on mixtures of thermal neutron absorbers that produce heavy-particle emission following thermal capture. In one configuration, B-10 based detector is used in a parallel electrode plate geometry that integrates neutron moderating sheets, such as polyethylene, on the back of the electrode plates to thermalize the neutrons and then detect them with high efficiency. The moderator can also be replaced with plastic scintillator sheets viewed with a large area photomultiplier tube to detect gamma-rays as well. The detector can be used in several scanning configurations including portal, drive-through, drive-by, handheld and backpack, etc.

18 Claims, 21 Drawing Sheets

Related U.S. Application Data

PCT/GB2009/001444 on Jun. 11, 2009, now Pat. No. 8,389,942.

(60) Provisional application No. 61/595,044, filed on Feb. 4, 2012, provisional application No. 61/289,207, filed on Dec. 22, 2009.

(56) References Cited

U.S. PATENT DOCUMENTS

| | | |
|---|---|---|
| 3,676,783 A | 7/1972 | Kinbara et al. |
| 3,766,387 A | 10/1973 | Heffan et al. |
| 3,767,850 A | 10/1973 | McMillian et al. |
| 3,770,955 A | 11/1973 | Tomita et al. |
| 3,784,837 A | 1/1974 | Holmstrom |
| RE28,544 E | 9/1975 | Stein et al. |
| 3,904,923 A | 9/1975 | Schwartz |
| 4,047,035 A | 9/1977 | Dennhoven et al. |
| 4,139,771 A | 2/1979 | Dennhoven et al. |
| 4,210,811 A | 7/1980 | Dennhoven et al. |
| 4,216,499 A | 8/1980 | Kunze et al. |
| 4,366,382 A | 12/1982 | Kotowski |
| 4,430,568 A | 2/1984 | Yoshida et al. |
| 4,563,707 A | 1/1986 | Kishida |
| 4,566,113 A | 1/1986 | Donges et al. |
| 4,599,740 A | 7/1986 | Cable |
| 4,626,688 A | 12/1986 | Barnes |
| 4,641,330 A | 2/1987 | Herwig et al. |
| 4,709,382 A | 11/1987 | Sones |
| 4,736,401 A | 4/1988 | Donges et al. |
| 4,788,704 A | 11/1988 | Donges et al. |
| 4,817,123 A | 3/1989 | Sones et al. |
| 4,825,454 A | 4/1989 | Annis et al. |
| 4,853,595 A | 8/1989 | Alfano et al. |
| 4,872,188 A | 10/1989 | Lauro et al. |
| 4,884,289 A | 11/1989 | Glockmann et al. |
| 4,979,202 A | 12/1990 | Siczek et al. |
| 4,991,189 A | 2/1991 | Boomgaarden et al. |
| 5,006,299 A | 4/1991 | Gozani et al. |
| 5,022,062 A | 6/1991 | Annis |
| 5,065,418 A | 11/1991 | Bermbach et al. |
| 5,076,993 A | 12/1991 | Sawa et al. |
| 5,091,924 A | 2/1992 | Bermbach et al. |
| 5,098,640 A | 3/1992 | Gozani et al. |
| 5,114,662 A | 5/1992 | Gozani et al. |
| 5,179,581 A | 1/1993 | Annis |
| 5,181,234 A | 1/1993 | Smith |
| 5,182,764 A | 1/1993 | Peschmann et al. |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis et al. |
| 5,313,511 A | 5/1994 | Annis et al. |
| 5,367,552 A | 11/1994 | Peschmann |
| 5,379,334 A | 1/1995 | Zimmer et al. |
| 5,493,596 A | 2/1996 | Annis |
| 5,548,123 A | 8/1996 | Perez-Mendez et al. |
| 5,606,167 A | 2/1997 | Miller |
| 5,608,214 A | 3/1997 | Baron et al. |
| 5,638,420 A | 6/1997 | Armistead |
| 5,642,393 A | 6/1997 | Krug et al. |
| 5,642,394 A | 6/1997 | Rothschild |
| 5,666,393 A | 9/1997 | Annis |
| 5,687,210 A | 11/1997 | Maitrejean et al. |
| 5,692,028 A | 11/1997 | Geus et al. |
| 5,751,837 A | 5/1998 | Watanabe et al. |
| 5,764,683 A | 6/1998 | Swift et al. |
| 5,768,334 A | 6/1998 | Maitrejean et al. |
| 5,787,145 A | 7/1998 | Geus |
| 5,805,660 A | 9/1998 | Perion et al. |
| 5,838,759 A | 11/1998 | Armistead |
| 5,903,623 A | 5/1999 | Swift et al. |
| 5,910,973 A | 6/1999 | Grodzins |
| 5,930,326 A | 7/1999 | Rothschild et al. |
| 5,940,468 A | 8/1999 | Huang et al. |
| 5,974,111 A | 10/1999 | Krug et al. |
| 6,011,266 A * | 1/2000 | Bell ................. 250/390.01 |
| 6,031,890 A | 2/2000 | Bermbach et al. |
| 6,058,158 A | 5/2000 | Eiler |
| 6,067,344 A | 5/2000 | Grodzins et al. |
| 6,081,580 A | 6/2000 | Grodzins et al. |
| 6,094,472 A | 7/2000 | Smith |
| 6,151,381 A | 11/2000 | Grodzins et al. |
| 6,188,747 B1 | 2/2001 | Geus et al. |
| 6,192,101 B1 | 2/2001 | Grodzins |
| 6,192,104 B1 | 2/2001 | Adams et al. |
| 6,195,413 B1 | 2/2001 | Geus et al. |
| 6,198,795 B1 | 3/2001 | Naumann et al. |
| 6,218,943 B1 | 4/2001 | Ellenbogen |
| 6,249,567 B1 | 6/2001 | Rothschild et al. |
| 6,252,929 B1 | 6/2001 | Swift et al. |
| 6,256,369 B1 | 7/2001 | Lai |
| 6,278,115 B1 | 8/2001 | Annis et al. |
| 6,282,260 B1 | 8/2001 | Grodzins |
| 6,292,533 B1 | 9/2001 | Swift et al. |
| 6,301,326 B2 | 10/2001 | Bjorkholm |
| 6,320,933 B1 | 11/2001 | Grodzins et al. |
| 6,347,132 B1 | 2/2002 | Annis |
| 6,356,620 B1 | 3/2002 | Rothschild et al. |
| 6,373,066 B1 * | 4/2002 | Penn ................. 250/390.11 |
| 6,424,695 B1 | 7/2002 | Grodzins et al. |
| 6,434,219 B1 | 8/2002 | Rothschild et al. |
| 6,435,715 B1 | 8/2002 | Betz et al. |
| 6,442,233 B1 | 8/2002 | Grodzins et al. |
| 6,445,765 B1 | 9/2002 | Frank et al. |
| 6,448,564 B1 | 9/2002 | Johnson et al. |
| 6,453,003 B1 | 9/2002 | Springer et al. |
| 6,453,007 B2 | 9/2002 | Adams et al. |
| 6,456,684 B1 | 9/2002 | Mun et al. |
| 6,459,761 B1 | 10/2002 | Grodzins et al. |
| 6,459,764 B1 | 10/2002 | Chalmers et al. |
| 6,473,487 B1 | 10/2002 | Le |
| RE37,899 E | 11/2002 | Grodzins et al. |
| 6,483,894 B2 | 11/2002 | Hartick et al. |
| 6,507,025 B1 | 1/2003 | Verbinski et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,580 B1 | 4/2003 | Carver et al. |
| 6,546,072 B1 | 4/2003 | Chalmers |
| 6,552,346 B2 | 4/2003 | Verbinski et al. |
| 6,563,903 B2 | 5/2003 | Kang et al. |
| 6,580,079 B1 * | 6/2003 | Craig et al. ........... 250/390.05 |
| 6,580,778 B2 | 6/2003 | Meder |
| 6,584,170 B2 | 6/2003 | Aust et al. |
| 6,597,760 B2 | 7/2003 | Beneke et al. |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers et al. |
| 6,663,280 B2 | 12/2003 | Doenges |
| 6,665,373 B1 | 12/2003 | Kotowski et al. |
| 6,665,433 B2 | 12/2003 | Roder |
| 6,727,506 B2 | 4/2004 | Mallette |
| 6,763,635 B1 | 7/2004 | Lowman |
| 6,785,357 B2 | 8/2004 | Bernardi et al. |
| 6,812,426 B1 | 11/2004 | Kotowski et al. |
| 6,816,571 B2 | 11/2004 | Bijjani et al. |
| 6,837,422 B1 | 1/2005 | Meder |
| 6,839,134 B2 | 1/2005 | Saito et al. |
| 6,839,403 B1 | 1/2005 | Kotowski et al. |
| 6,843,599 B2 | 1/2005 | Le et al. |
| 6,920,197 B2 | 7/2005 | Kang et al. |
| 6,924,487 B2 | 8/2005 | Bolozdynya et al. |
| 6,928,141 B2 | 8/2005 | Carver et al. |
| 6,965,314 B2 | 11/2005 | Bohinc, Jr. |
| 7,039,159 B2 | 5/2006 | Muenchau et al. |
| 7,045,788 B2 | 5/2006 | Iwatschenko-Borho et al. |
| 7,099,434 B2 | 8/2006 | Adams et al. |
| 7,103,137 B2 | 9/2006 | Seppi et al. |
| 7,116,235 B2 | 10/2006 | Alioto et al. |
| 7,166,844 B1 | 1/2007 | Gormley et al. |
| 7,207,713 B2 | 4/2007 | Lowman |

(56) References Cited

U.S. PATENT DOCUMENTS

| | | | |
|---|---|---|---|
| 7,238,951 B2 | 7/2007 | Disdier et al. | |
| 7,244,947 B2 | 7/2007 | Polichar et al. | |
| 7,260,255 B2 | 8/2007 | Polichar et al. | |
| 7,322,745 B2 | 1/2008 | Agrawal et al. | |
| 7,335,891 B2 * | 2/2008 | Kniss et al. | 250/370.11 |
| 7,352,843 B2 | 4/2008 | Hu et al. | |
| 7,372,040 B2 | 5/2008 | Polichar et al. | |
| 7,420,174 B2 | 9/2008 | Kurita | |
| 7,453,987 B1 | 11/2008 | Richardson | |
| 7,483,511 B2 | 1/2009 | Bendahan et al. | |
| 7,505,556 B2 | 3/2009 | Chalmers et al. | |
| 7,505,557 B2 | 3/2009 | Modica et al. | |
| 7,525,101 B2 | 4/2009 | Grodzins | |
| 7,547,888 B2 | 6/2009 | Cooke et al. | |
| 7,649,976 B2 | 1/2010 | Georgeson et al. | |
| 7,724,869 B2 | 5/2010 | Wang et al. | |
| 7,738,687 B2 | 6/2010 | Tortora et al. | |
| 7,741,612 B2 | 6/2010 | Clothier et al. | |
| 7,760,103 B2 | 7/2010 | Frank | |
| 7,783,003 B2 | 8/2010 | Clayton | |
| 7,800,073 B2 | 9/2010 | Clothier et al. | |
| 7,809,104 B2 | 10/2010 | Foland | |
| 7,876,879 B2 | 1/2011 | Morton | |
| 7,915,596 B2 | 3/2011 | Clothier et al. | |
| 7,952,079 B2 | 5/2011 | Neustadter et al. | |
| 7,982,191 B2 | 7/2011 | Friedman et al. | |
| 8,031,903 B2 | 10/2011 | Paresi et al. | |
| 8,173,970 B2 | 5/2012 | Inbar | |
| 8,263,938 B2 | 9/2012 | Bjorkholm | |
| 8,389,941 B2 | 3/2013 | Bendahan et al. | |
| 8,389,942 B2 | 3/2013 | Morton | |
| 8,502,699 B2 | 8/2013 | Zerwekh et al. | |
| 8,735,833 B2 | 5/2014 | Morton | |
| 2004/0104500 A1 * | 6/2004 | Bross et al. | 264/85 |
| 2004/0178339 A1 | 9/2004 | Gentile et al. | |
| 2005/0023479 A1 | 2/2005 | Grodzins | |
| 2005/0117700 A1 | 6/2005 | Peschmann | |
| 2007/0085010 A1 | 4/2007 | Letant et al. | |
| 2007/0272874 A1 * | 11/2007 | Grodzins | 250/390.11 |
| 2009/0045348 A1 * | 2/2009 | Stuenkel et al. | 250/390.11 |
| 2009/0134334 A1 * | 5/2009 | Nelson | 250/361 R |
| 2011/0266643 A1 | 11/2011 | Engelmann et al. | |

FOREIGN PATENT DOCUMENTS

| | | | |
|---|---|---|---|
| EP | 287707 | | 10/1988 |
| EP | 919186 | | 6/1999 |
| EP | 1413898 | | 4/2004 |
| GB | 2255634 | | 11/1992 |
| GB | 2424065 | | 9/2006 |
| GB | 2438317 | | 11/2007 |
| JP | 2009047559 A | * | 3/2009 |
| WO | WO9855851 | | 12/1998 |
| WO | WO2004010127 | | 1/2004 |
| WO | WO2005098400 | | 10/2005 |
| WO | WO2006036076 | | 4/2006 |
| WO | WO2006045019 | | 4/2006 |
| WO | WO2006078691 | | 7/2006 |
| WO | WO2006095188 | | 9/2006 |
| WO | WO2007035359 | | 3/2007 |
| WO | WO2007051092 | | 5/2007 |
| WO | WO2007068933 | | 6/2007 |
| WO | WO2008017983 | | 2/2008 |
| WO | WO2009106803 | | 9/2009 |
| WO | WO2009141613 | | 11/2009 |
| WO | WO2009141615 | | 11/2009 |
| WO | WO2009150416 | | 12/2009 |
| WO | WO2011087861 | | 7/2011 |
| WO | WO2013116241 | | 8/2013 |

OTHER PUBLICATIONS

Molchanov et al., "Nanosecond Gated Optical Sensors for Ocean Optic Applications," Sensors Applications Symposium, 2006, Proceedings of the 2006 IEEE, Feb. 7, 2006, 147-150.

International Search Report PCT/GB2009/000515, Feb. 23, 2010, Rapiscan Security Products, Inc.

International Search Report PCT/GB2009/000497, Jan. 26, 2010, Rapiscan Security Products, Inc.

International Search Report for WO2009/106847, Sep. 3, 2009, Rapiscan Security Products.

International Search Report PCT/GB2009/001277, May 20, 2008, Rapiscan Systems, Inc.

International Search Report PCT/GB2009/001275, Nov. 26, 2009, Rapiscan Security Products, Inc.

International Search Report PCT/GB2009/001250, May 20, 2009, Rapiscan Security Products Inc.

International Search Report for WO 2011/087861, May 31, 2012, Rapiscan Systems, Inc.

International Search Report for PCT/GB2006/000859, mailed on May 19, 2006, Corus UK Ltd.

International Search Report for PCT/GB2009/001444, mailed on Apr. 6, 2010, Rapiscan Security Products Inc.

International Search Report for PCT/US10/61908, mailed on Apr. 2, 2012 , Rapiscan Systems, Inc.

International Search Report for PCT/US13/23684, mailed on Jun 28, 2013, Rapiscan Systems Inc.

* cited by examiner

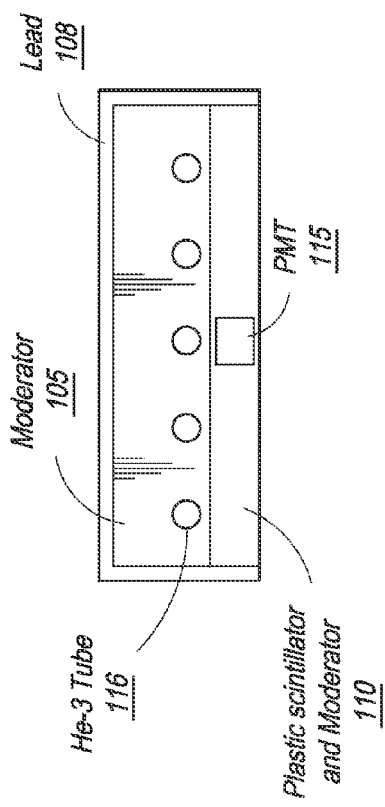
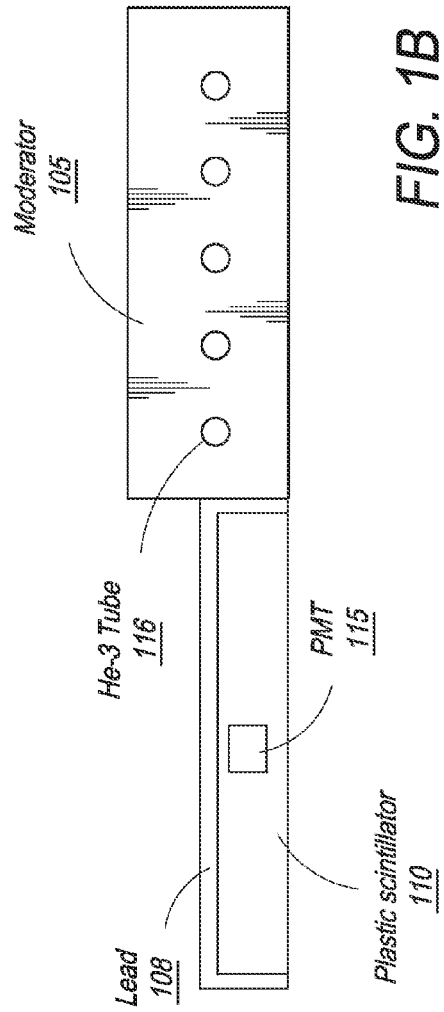

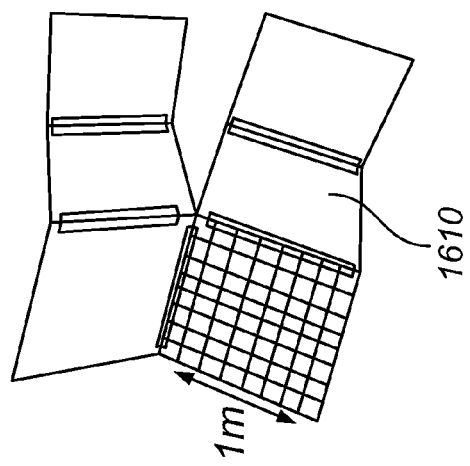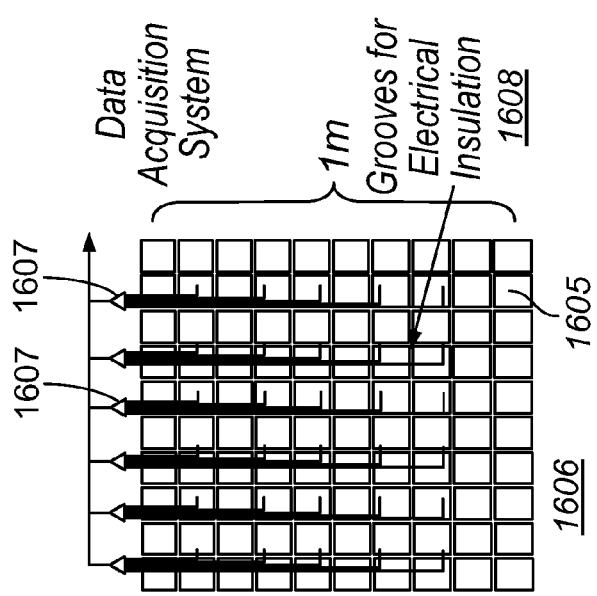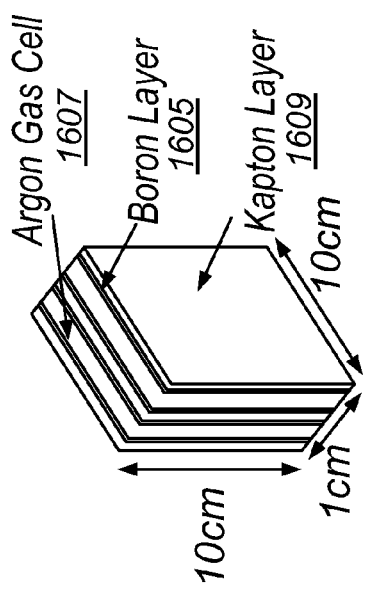

Step 4
1930

Step 5
1940

Additional Step 6
1950

COMPOSITE GAMMA-NEUTRON DETECTION SYSTEM

CROSS-REFERENCE TO RELATED APPLICATIONS

The present application is a continuation-in-part of U.S. patent application Ser. No. 12/976,861, entitled "Composite Gamma Neutron Detection System" filed on Dec. 22, 2010, which relies on U.S. Provisional Patent Application No. 61/289,207, of the same title, and filed on Dec. 22, 2009, for priority.

In addition, the present application is a continuation-in-part of U.S. patent application Ser. No. 12/997,251, entitled "Photomultiplier and Detection Systems", filed on Dec. 10, 2010, for priority, which is a national stage application of PCT/GB2009/001444, filed on Jun. 11, 2009 and which relies on Great Britain Patent Application Number 0810638.7, filed on Jun. 11, 2008, for priority.

The present application also relies on U.S. Patent Provisional Application No. 61/595,044, filed on Feb. 4, 2012, for priority.

All of the above-mentioned applications are herein incorporated by reference in their entirety.

FIELD OF THE INVENTION

The present specification generally relates to the field of detection of radioactive materials, specifically to systems and techniques for detecting neutrons and gamma rays and more specifically to a neutron and gamma-ray based detection system and method that is cost-effective, compact, and fabricated from readily available materials.

BACKGROUND

Physical shipment of materials, including the shipment of mail, merchandise, raw materials, and other goods, is an integral part of any economy. Typically, the materials are shipped in a type of shipping containment or cargo box. Such containments or boxes include semi-trailers, large trucks, and rail cars as well as inter-modal containers that can be carried on container ships or cargo planes. However, such shipping or cargo containers can be used for illegal transportation of contraband such as nuclear and radioactive materials. Detection of these threats require a rapid, safe and accurate inspection system for determining the presence of hidden nuclear materials, especially at state and national borders, along with transit points such as airports and shipping ports.

Currently, both passive and active detection techniques are employed for the detection of concealed nuclear materials. Passive detection techniques are based on the principle that nuclear and radiological threats emit gamma, and in some cases neutron, radiation that can be detected. Although passive detection systems can be easily deployed, they suffer from a number of drawbacks, including high rates of false positives and misdetections caused by unavoidable factors such as depression of the natural background by the vehicle being scanned and its contents, variation in natural background spectrum due to benign cargo such as clay tiles, fertilizers, etc., and the presence of radio therapeutic isotopes in the cargo with gamma lines at or near threat lines. Further, many gamma sources are self-shielded and/or can readily be externally shielded, which makes them difficult to detect, since the radiation is absorbed in the shielding. Also, in general, gamma detectors make poor neutron detectors and good neutron detectors tend to be poor gamma detectors.

Other detection techniques employ uncharged particles, such as neutrons and photons (gamma rays) to irradiate suspicious containers. Uncharged particles have the potential to penetrate relatively large dense objects to identify particular elements of interest; thus, some detection devices utilize the absorption and/or scattering patterns of neutrons or photons as they interact with certain elements present in the object being inspected. Examples of such devices can be found in U.S. Pat. Nos. 5,006,299 and 5,114,662, which utilize thermal neutron analysis (TNA) techniques for scanning luggage for explosives, and in U.S. Pat. No. 5,076,993 which describes a contraband detection system based on pulsed fast neutron analysis (PFNA). All the aforementioned patents are incorporated herein by reference.

Active detection techniques, such as Differential Dieaway Analysis (DDA) and measurements of delayed gamma-ray and neutrons following either neutron- or photon-induced fission, can be used to detect the presence of fissile materials. The radiation is measured with neutron and gamma-ray detectors, preferentially insensitive to each other's radiation. Detection of delayed neutrons is an unequivocal method to detect fissile materials even in the presence of shielding mechanism(s) to hide the nuclear materials and notwithstanding the low background compared to delayed gamma rays. Because the number of delayed neutrons is two orders of magnitude lower than the number of delayed gamma rays, efficient and large area detectors are required for best sensitivity in neutron detection.

Each of the detector systems described above is not without drawbacks. In particular, these devices generally utilize accelerators that produce high energy neutrons with a broad spectrum of energies. The absorption/scattering of neutrons traveling at specific energies is difficult to detect given the large number of neutrons that pass through the object without interaction. Thus, the "fingerprint" generated from the device is extremely small, difficult to analyze, and often leads to significant numbers of false positive or false negative test results.

In addition, known prior art detection systems have limitations in their design and method that prohibit them from achieving low radiation doses, which poses a risk to the personnel involved in inspection as well as to the environment, or prevent the generation of high image quality, which are prerequisites for commercial acceptance.

While the use of both passive and active detection techniques is desirable, what is needed is a neutron and gamma-ray based detection system and method that is cost-effective, compact, and wherein the neutron detector is fabricated from readily available materials.

The most commonly used neutron detector is a He-3 gas proportional chamber. Here, He-3 interacts with a neutron to produce a He-4 ion. This ion is accelerated in the electric field of the detector to the point that it becomes sufficiently energetic to cause ionisation of other gas atoms. If carefully controlled, an avalanche breakdown of the gas can be generated, which results in a measurable current pulse at the output of the detector. By pressurizing the gas, the probability of a passing thermal neutron interacting in the gas can be increased to a reasonable level. However, He-3 is a relative scarce material and it does not occur naturally. This makes the availability and future supply of such detectors somewhat uncertain. Further, a special permit is required to transport pressurized He-3 tubes, which can be cumbersome and potentially problematic.

The most common globally deployed passive radioactive material detectors employ a neutron moderator 105 in an upper portion, having a plurality of He-3 detector tubes 116 embedded therein covered by a lead shield 108 and a lower portion comprising a plastic scintillator and moderator 110 with a PMT (Photo Multiplier Tube) 115 embedded therein, as shown in FIG. 1A. This detector configuration, however, still employs the scarce He-3. In addition, another commonly deployed detector where the gamma-ray and neutron detectors are separate is shown in FIG. 1B. As shown in FIG. 1B, neutron moderator 105, comprising a plurality of He-3 detector tubes 116 is positioned adjacent to plastic scintillator 110, comprising a PMT 115 and a lead shield 108. This detector configuration, however, still employs the scarce He-3 and takes up a larger footprint.

Several alternative detectors to replace He-3 detectors have been identified. However, many of these detectors are also sensitive to gamma rays, which is not acceptable in applications where neutrons must be discriminated from gamma rays.

Therefore, what is needed is a neutron and gamma-ray based detection system and method that is cost-effective, compact, and wherein the neutron detector is fabricated from readily available materials. In addition, what is needed is a cost-effective and compact detection system in which neutron and gamma-ray detectors are separate.

SUMMARY OF THE INVENTION

The present specification describes, in one embodiment, a thinly-coated $^{10}$B flat-panel ionization chamber neutron detector, which can be deployed as a direct drop-in replacement for current Radiation Portal Monitor (RPM) $^{3}$He detectors.

In one embodiment, the detector of the present specification comprises an argon gas cell sandwiched between boron-coated anode and cathode electrode plates.

In one embodiment, multiple cells are stacked together to increase the intrinsic efficiency of the detector. In one embodiment, the detector is multi-layered and includes greater than 20 layers.

In one embodiment, multiple detector unit cells are "tiled" to achieve areas of us to 1 square meter. In one embodiment, large detector units are folded for ease of transportation.

In one embodiment, parallel plate geometry is employed, which allows for integration of neutron moderating sheets, such as polyethylene, on the back of the electrode plates to thermalize the neutrons and then detect them with high efficiency. Optionally, the moderator can be replaced with plastic scintillator sheets that can be viewed with a large area photomultiplier tube to detect gamma-rays in addition to neutrons, as is the case with existing RPMs.

The present specification further describes a large-area detector that is simple in its construction and manufacture, easily scalable with respect to the unit cell detector, easily adaptable to a variety of applications, and low cost.

In one embodiment, the present specification is directed towards a neutron unit cell detector, comprising: a first and a second layer, comprising a polyethylene, for moderating a fast neutron; a third and a fourth layer comprising B-10, for capturing a moderated fast neutron, wherein the third and fourth layers are positioned between the first and second layers; and a gas cell layer positioned between the third and fourth layers, which, when a neutron is captured, emit charged particles that ionize the gas in the gas cell layer creating free electron and ion pairs.

In one embodiment, the neutron detector comprises a plurality of unit cell detectors, which are stacked, thereby increasing detector efficiency.

In another embodiment, the present specification is directed towards a gamma-neutron unit cell detector, comprising: a first and a second layer comprising gamma sensitive plastic scintillators for moderating a fast neutron and detecting gamma rays; a third and a fourth layer comprising B-10 for capturing a moderated fast neutron, wherein the third and fourth layers are positioned between the first and second layers; and a gas cell layer positioned between the third and fourth layers, which, when a neutron is captured, emit charged particles that ionize the gas in the gas cell layer creating free electron and ion pairs.

In one embodiment, the gamma-neutron detector comprises a plurality of unit cell detectors, which are stacked, thereby increasing detector efficiency.

In one embodiment, the plastic scintillator comprises at least one of an organic solid scintillator, an inorganic solid scintillator, or a liquid scintillator positioned between glass layers.

In another embodiment, the present specification is directed towards a method for manufacturing a scalable, low-cost, large-area boron substrate for use in a detector comprising: employing a thin copper foil sheet as a metallic base; attaching the copper foil to a rigid layer to form a composite base for providing large areal structural strength; etching a tile pattern and individual electrical lines into the composite base by immersing the composite base in a ferric-chloride solution; mounting the composite base onto a drum for vacuum deposition; and depositing boron onto a surface of the copper foil to form the said boron substrate, wherein a mask is used to block the deposition of boron onto the electrical lines. In one embodiment, the thickness of the copper foil ranges from 50 to 100 µm. In one embodiment, the rigid layer comprises Kapton.

In one embodiment, the method of manufacturing the large area boron substrate optionally comprises the step of fabricating a fast neutron detector by laminating the boron substrate onto a sheet of polyethylene.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 1A illustrates a prior art radioactive material detector comprising a neutron moderator and a plastic scintillator, in which He-3 is employed;

FIG. 1B illustrates a prior art radioactive material detector comprising a neutron moderator and a plastic scintillator, in which He-3 is employed;

FIG. 16A illustrates an exemplary manner in which scalability can be achieved for manufacturing the B-10 detector of the present specification;

FIG. 16B illustrates an exemplary manner in which scalability can be achieved for manufacturing the B-10 detector of the present specification;

FIG. 16C illustrates an exemplary manner in which scalability can be achieved for manufacturing the B-10 detector of the present specification;

DETAILED DESCRIPTION OF THE INVENTION

Figure 1C:
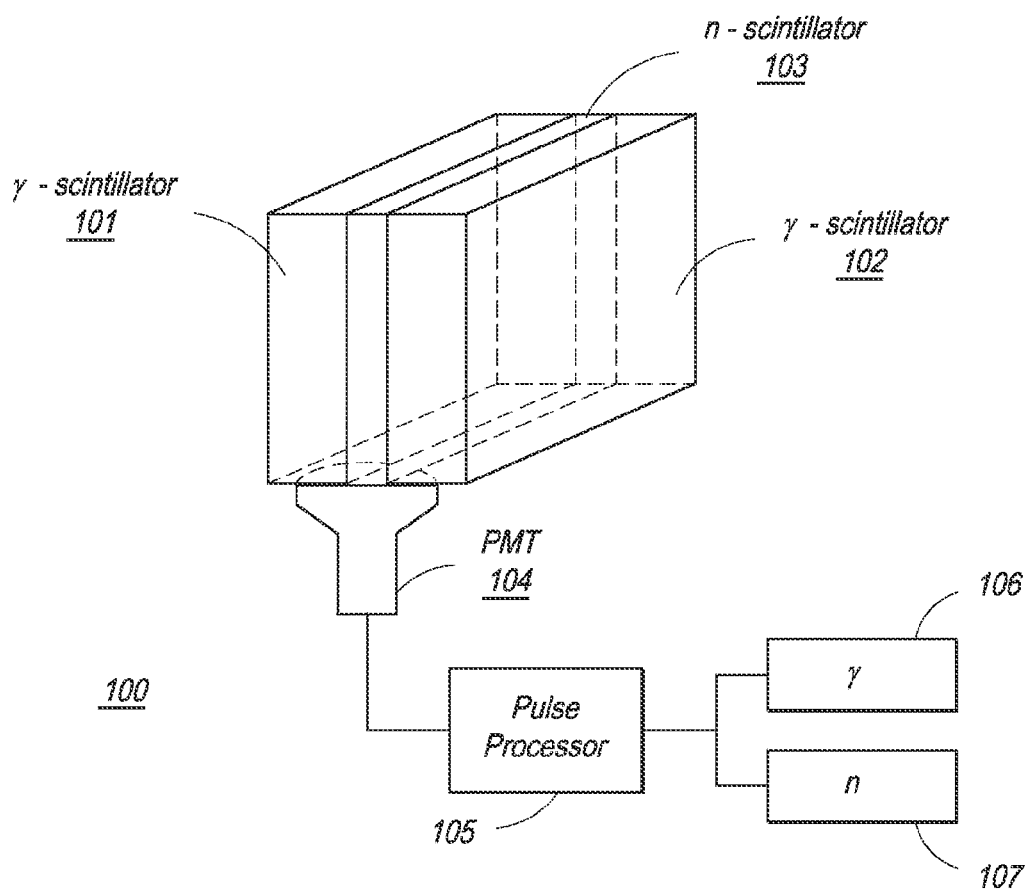
FIG. 1C is a schematic layout of the composite gamma-neutron detector according to one embodiment of the present invention.

The present specification discloses systems and methods for detecting radiological threats using a composite gamma-neutron detector which can be configured to have a high sensitivity for both gamma and neutron detection, with a sufficient separation of the gamma and neutron signatures. The system of the present invention allows for maximum threat detection with minimum false alarms, and thus increased throughput.

Further, the present specification is directed towards a composite gamma-neutron detection system and method that is cost-effective, compact, and wherein the neutron detector is fabricated from readily available materials.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Several nuclei have a high cross-section for detection of thermal neutrons. These nuclei include He, Gd, Cd and two particularly high cross-section nuclei: Li-6 and B-10. In each case, after the interaction of a high cross-section nucleus with a thermal neutron, the result is an energetic ion and a secondary energetic charged particle.

For example, the interaction of a neutron with a B-10 nucleus can be characterized by the following equation:

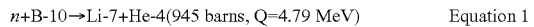

$$n+\text{B-10} \rightarrow \text{Li-7}+\text{He-4}(945 \text{ barns}, Q=4.79 \text{ MeV}) \qquad \text{Equation 1}$$

Here, the cross section and the Q value, which is the energy released by the reaction, are shown in parenthesis.

Similarly, the interaction of a neutron with a Li-6 nucleus is characterized by the following equation:

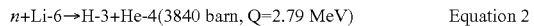

$$n+\text{Li-6} \rightarrow \text{H-3}+\text{He-4}(3840 \text{ barn}, Q=2.79 \text{ MeV}) \qquad \text{Equation 2}$$

It is known that charged particles and heavy ions have a short range in condensed matter, generally travelling only a few microns from the point of interaction. Therefore, there is a high rate of energy deposition around the point of interaction. In the present invention, molecules containing nuclei with a high neutron cross section are mixed with molecules that provide a scintillation response when excited by the deposition of energy. Thus, neutron interaction with Li-6 or B-10, for example, results in the emission of a flash of light when intermixed with a scintillation material. If this light is transported via a medium to a photodetector, it is then possible to convert the optical signal to an electronic signal, where that electronic signal is representative of the amount of energy deposited during the neutron interaction.

Further, materials such as Cd, Gd and other materials having a high thermal capture cross section with no emission of heavy particles produce low energy internal conversion electrons, Auger electrons, X-rays, and gamma rays ranging in energy from a few keV to several MeV emitted at substantially the same time. Therefore, a layer of these materials, either when mixed in a scintillator base or when manufactured in a scintillator, such as Gadolinium Oxysulfide (GOS) or Cadmium Tungstate (CWO) will produce light (probably less than heavier particles). GOS typically comes with two activators, resulting in slow (on the order of 1 ms) and fast (on the order of 5 µs) decays. CWO has a relatively fast decay constant. Depending on the overall energy, a significant portion of the energy will be deposited in the layer, while some of the electrons will deposit the energy in the surrounding scintillator. In addition, the copious X-rays and gamma rays produced following thermal capture will interact in the surrounding scintillator. Thus, neutron interactions will result in events with both slow and fast decay constants. In many cases, neutron signals will consist of a signal with both slow and fast components (referred to as "coincidence") due to electron interlacing in the layer and gamma rays interacting in the surrounding scintillator.

The scintillation response of the material that surrounds the Li-6 or B-10 nuclei can be tuned such that this light can be transported through a second scintillator, such as a plastic scintillator in one embodiment, with a characteristic which is selected to respond to gamma radiation only. In another embodiment, the material that surrounds the Li-6 or B-10 is not a scintillator, but a transparent non-scintillating plastic resulting in a detector that is only sensitive to neutrons.

Thus, the plastic scintillator is both neutron and gamma sensitive. When a neutron is thermalized and subsequently captured by the H in the detector, a 2.22 MeV gamma ray is also emitted and often detected. In this manner, the present invention achieves a composite gamma-neutron detector capable of detecting neutrons as well as gamma radiation with high sensitivity. Further, the composite detector of the present invention also provides an excellent separation of the gamma and neutron signatures. It should be noted herein that in addition to charged particles, B-10 produces gamma rays. Therefore, in using materials that produce gamma rays following neutron capture, the result may be a detection that looks like gamma rays. Most applications, however, want to detect neutrons; thus, the detector of the present invention is advantageous in that it also detects the neutrons.

FIG. 1C illustrates a schematic layout of the composite gamma-neutron detector 100 according to one embodiment of the present invention. Referring to FIG. 1C, the detector design employs two gamma-sensitive scintillation panels (gamma-detectors) 101 and 102 that surround a single neutron detector 103. The neutron detector 103 further comprises a single slab of neutron sensitive composite scintillator, in which nuclei of a neutron sensitive material such as Li-6 or B-10 are mixed with a scintillation material such as ZnS. In one embodiment, a density of 20-30% by volume can be achieved for the neutron sensitive material (such as Li-6) while maintaining an efficient scintillation response from ZnS.

In one embodiment, gamma detector panels can be fabricated from solid scintillation materials (without a substrate) such as, but not limited to organic scintillators, including solid plastic scintillators (e.g. NE102) and anthracene; inorganic scintillators including NaI(Tl), CsI(Tl), CsI(Na), and $BaF_2$.

In another embodiment, it is possible to position liquid scintillators between glass sheets to act as the gamma detector. These tend to use organic solvents formed with the anthracene molecule as their base with organometallic compounds to enhance scintillation efficiency and therefore are generally less easy to use than solid scintillators.

In one embodiment, the neutron detector may be comprised of binder molecules such as, but not limited to styrenes dissolved in suitable solvents as the base substrate. As the solvent evaporates, a plastic film forms which, once dry, is quite stable and self-supporting. The scintillation material (for example ZnS) and the neutron specific element (i.e. Gd, Li, B, etc.) are intermixed with the solvent and binder prior to solvent evaporation. As the solvent evaporates, an intimate mixture of all three components is formed.

In an alternative embodiment, a Gd, Li or B loaded liquid scintillator (generally based on the anthracene molecule with suitable organometallic compounds to increase scintillation efficiency) can be sealed in the gap between the gamma scintillation panels. Advantageously, a thin glass barrier will be placed between the neutron scintillator and the gamma-detector to prevent chemical interaction between the two scintillator materials.

In one embodiment, a typical panel size ranges from 0.1 m×0.1 m for handheld applications up to 2 m×1 m for large fixed site installations. Above this maximum size, light collection starts to become an issue as does physical handling and packaging. Below the minimum size, detection efficiency will start to drop below useful levels, resulting in increasingly long measurement times.

In one embodiment, the gamma detector is thicker than the neutron detector. The gamma detector thickness will advantageously be no less than 0.01 m (for hand held applications) up to 0.2 m for large fixed site systems. The front gamma detector may be optimized to a different thickness compared to the back gamma detector in order to maximize overall gamma and neutron detection efficiency. For example, a front gamma detector thickness of 0.05 m and a rear gamma detector thickness of 0.1 m would be applicable to a large fixed site system. The neutron detector will generally be thin to minimize gamma interaction probability and to maximize the chance of light escape from the scintillator. A typical neutron detector based on a solid screen scintillator would be in the range of 0.5-1 mm thick while a liquid neutron scintillator may be in the range of 0.01 to 0.05 m thick.

Optical signals from both the gamma detectors 101, 102 and the neutron detector 103 are readout by one or more photodetectors, which in one embodiment are photomultiplier tubes (PMTS) 104. The optical signals are thus converted to electronic signals which are then processed by a pulse processor 105 which assigns interactions separately due to gamma and neutron interactions 106 and 107, respectively.

In one embodiment, the gamma-sensitive 101 and 102 panels are advantageously fabricated from a plastic scintillator with a fast decay time, such as less than 0.1 µs. Further, the Li-6 or B-10 nuclei of the neutron detector 103 are advantageously mixed with a scintillation material having a slower decay time, such as ZnS. In one embodiment, the decay time for the scintillation material is greater than 1 µs. The difference in decay times for scintillators in gamma detectors and in neutron detector contributes to provide a significant separation between the gamma and neutron signatures 106 and 107. In general, it is desirable to select a scintillation material with low atomic number so as to minimise the probability of direct excitation by a passing gamma ray which causes enhanced gamma-neutron rejection.

In another embodiment, the Li-6 or B-10 is mixed with a material with very fast response (~10 ns) and surrounded by a material with slow response (~1 µs).

It may be noted that if material used around Li-6 is a very fast scintillator, the detector can measure neutrons at a very high counting rate, in particular when no scintillator is used to surround it.

One of ordinary skill in the art would appreciate that scintillation materials such as ZnS can absorb their own light and therefore there is a limit to the thickness of a scintillation based detector in ZnS. It may be noted that this thickness is typically only a few millimeters. Further, since light is emitted isotropically during each scintillation event, it is efficient to form the scintillator into a wide area screen where light emission can be captured from both sides of the screen simultaneously. Therefore, in one embodiment the scintillator based neutron detector 103 is designed as a screen with a wide area, such that light may be collected with a high efficiency from both sides of the screen.

It may be noted that the detection efficiency of a 1 mm thick Li-6/ZnS screen is of the same order as that of a pressurised He-3 gas proportional tube several cm in diameter. That is, the Li-6/ZnS based neutron detector of the present invention offers equivalent or greater detection efficiency as compared to the pressurised He-3 gas tube detector, at a much reduced size.

Figure 2:
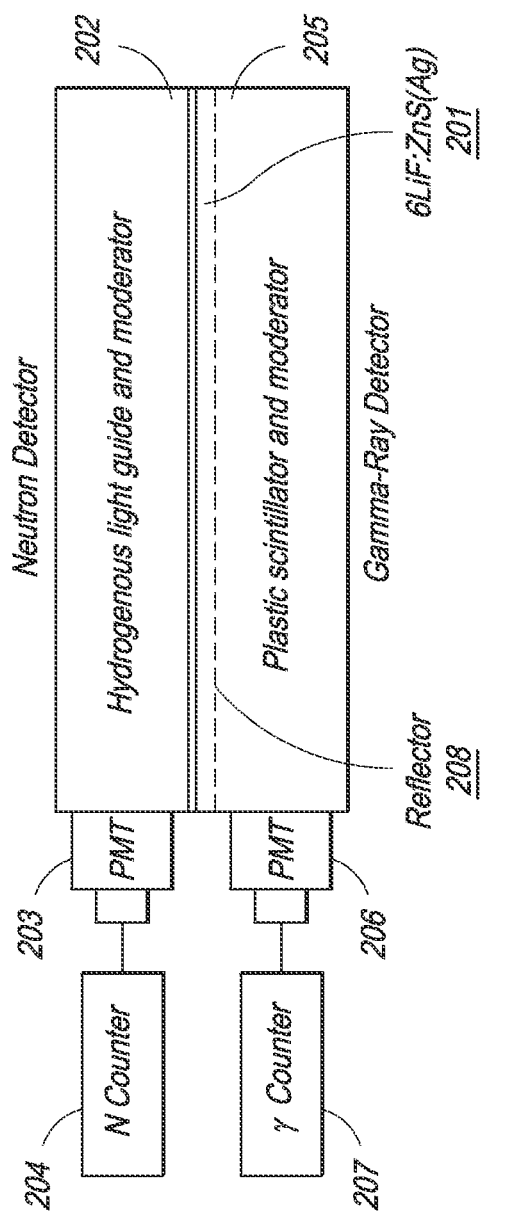
FIG. 2 illustrates an exemplary neutron detector based on mixtures of silver activated zinc sulfide.

Therefore, in one embodiment, a neutron detector is based on mixtures of silver activated zinc sulfide, ZnS(Ag), with the mixtures containing materials with high thermal neutron-capture cross section with emission of heavy particles, such as $^6$Li or $^{10}$B. That is, the mixtures consist of thermal neutron absorbers that produce heavy-particle emission following thermal capture. FIG. 2 illustrates one such exemplary neutron detector 200. Referring to FIG. 2, the detector 200 consists of one or more thin screens 201, comprising the ZnS(Ag) based mixtures, as described above. The screens 201, in one embodiment, have a thickness of about 0.5 mm and are embedded in a transparent hydrogenous light guide 202. Light guide 202 also serves as a neutron moderator. The light produced by neutron interaction in the ZnS(Ag) phosphorus screen is collected by the light guide 202 into a photodetector, such as a photomultiplier tube (PMT) 203, which produces a signal from which the neutrons are counted, using the counter 204.

The technology described above can also be implemented with simultaneous gamma-ray detection with the same basic electronics. Thus, the detector 200 further comprises a plastic scintillator 205, which serves as a gamma-ray detector and moderator. The plastic scintillator may be made up polyvinyl toluene or PVT, or any other suitable plastic scintillator material known in the art. Light produced by gamma-ray interactions in the scintillator 205 is detected by another PMT 206, which produces a signal from which the gamma-ray events are counted, using the counter 207. In one embodiment, counter 207 is a Multi-Channel Analyzer (MCA) that is used to measure the spectra of the gamma rays.

A reflector foil 208 is placed between the plastic scintillator 205 and the screen(s) 201 to prevent cross-contamination between optical signals from the neutron and gamma detection materials. Thus, the reflector is used to prevent light produced from the gamma rays to be collected with the same PMT as light produced by the neutrons. This prevents appearance of false neutron counts from gamma rays. Due to the reflector 208, some of the light produced by neutron interactions in the screen will be reflected back into the light guide.

The design of FIG. 2 provides a compact gamma-ray/neutron detector with the advantages of standard electronics and significantly high gamma-ray rejection. A small fraction of gamma rays will interact with the Li-6 sheet and will produce a low-intensity signal. This signal can be removed by thresholding, at the expense of some neutron detection. In one embodiment, a pulse shape discriminator can be employed within neutron channel 204 to enhance gamma-ray rejection.

Figure 3:
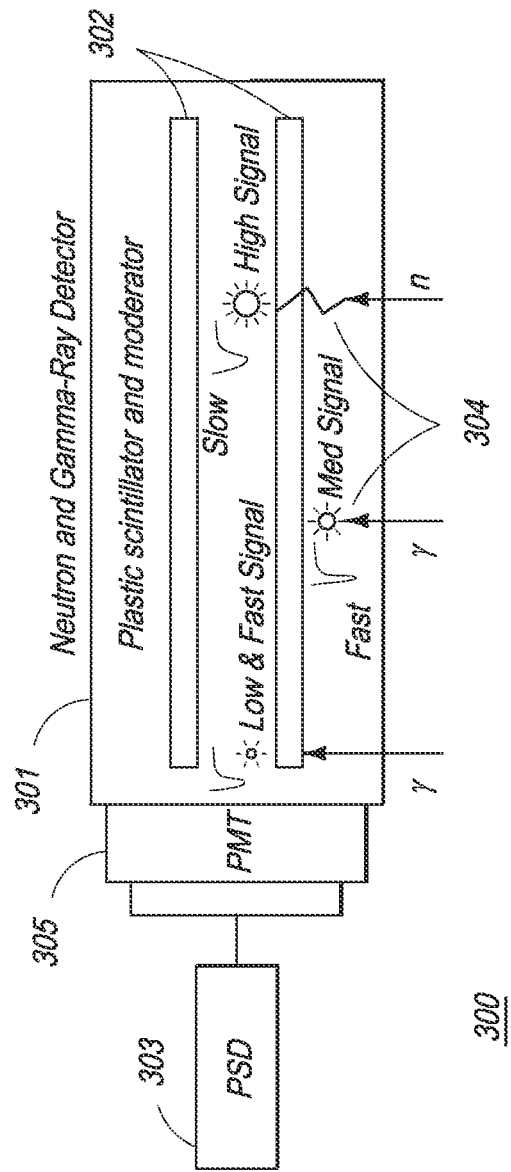
FIG. 3 illustrates an exemplary neutron detector based on mixtures of silver activated zinc sulfide that also uses a plastic scintillator for gamma ray detection.

Another exemplary detector 300 for simultaneous neutron and gamma-ray detection is shown in FIG. 3. In this case, the light guide material is replaced by a plastic scintillator 301, which serves as the gamma-ray detector, moderator and light guide. The detector 300 also includes screens 302, which are preferably thin and fabricated from ZnS(Ag) based mixtures for neutron detection. The neutrons and gamma-ray events are separated employing a Pulse-Shape Discrimination (PSD) circuit 303 between the pulses 304 generated from the ZnS(Ag) and plastic scintillator (PVT). Additionally, gamma-ray rejection is obtained as the light produced by electron interaction in the screen have similar decay time as the PVT's and will be eliminated with PSD. The light produced is transported via the transparent and neutron moderating medium 301 to a Photomultiplier Tube (PMT) 305 where the light is converted to a measurable signal to measure gamma as well as neutron events. The advantage of this hybrid neutron/gamma-ray detector approach is that the same PMT can be employed to measure the neutron as well as gamma events.

Figure 4:
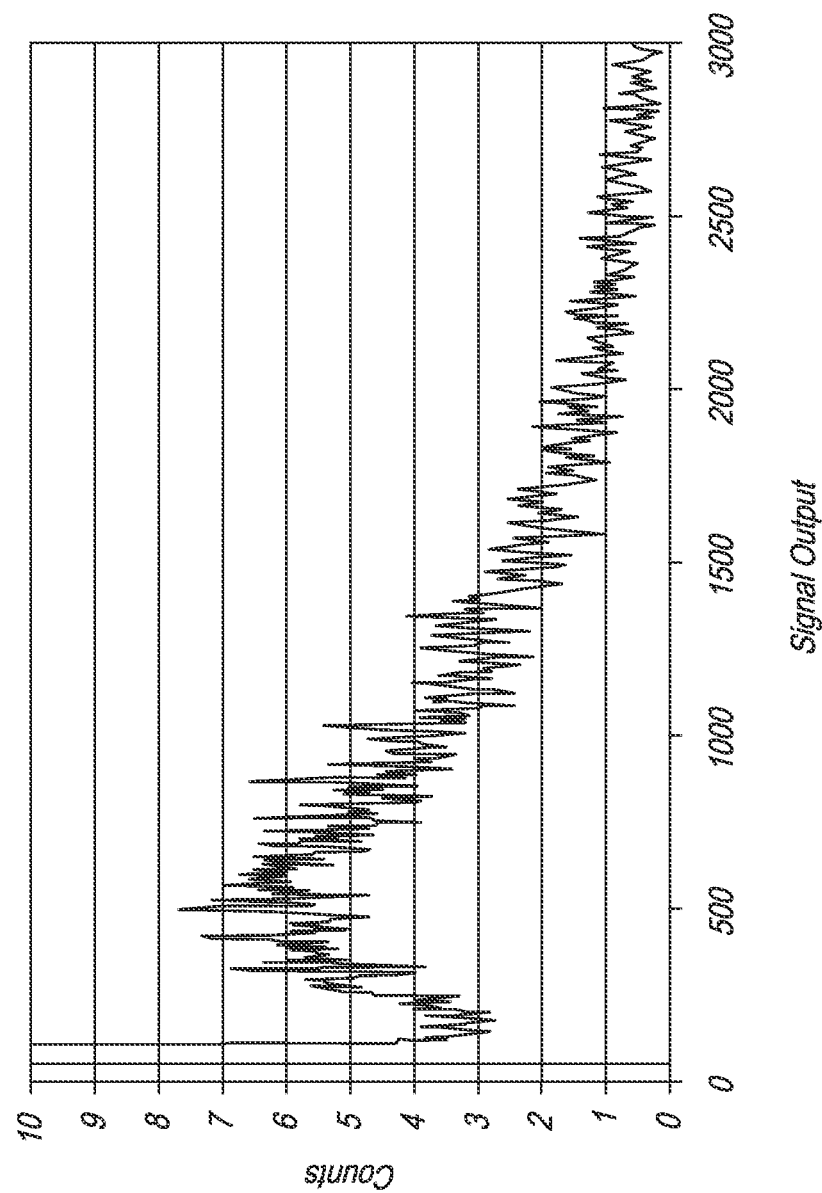
FIG. 4 illustrates experimental results with the silver activated zinc sulfide based neutron detector.

FIG. 4 illustrates the performance of an exemplary detector with a $^6$LiF:ZnS(Ag) screen embedded in a light-guide with two $^6$LiF concentrations and thickness. The results in FIG. 4 show the signal for the 1:2 weight ratio and screen thickness of 0.45 mm. Similar results were obtained with simulations employing 1, 2 and 3 $^6$LiF:ZnS(Ag) screens embedded in polyethylene, and detection efficiencies ranging from around 12% to 22% were obtained. One of ordinary skill in the art would appreciate that this efficiency is comparable to the highest efficiency achievable with closely-packed three rows $^3$He detectors, which is around 25%.

The signal distribution in FIG. 4 shows that not all the particle energy absorption is converted to light and that some of the light may be absorbed by the screen. This demonstrates the need for a comprehensive optimization where the right concentration of $^6$Li is obtained to produce high neutron absorption, while still having sufficient interactions in the scintillator to produce a sizeable light output. The screen thickness, the number of screens and moderator thickness are also important optimization parameters.

For applications focused on neutron detection, a major advantage of ZnS(Ag) phosphorus is the large light output for heavy particles compared with electrons produced by gamma-ray interactions. Also, due to the small thickness of the screen, the gamma-ray detection efficiency is low. Further, since the time-decay of the PVT light is ~3 ns, similar to that of the light produced by electrons in the ZnS(Ag) screen, PSD will also reject gamma rays interacting in the PVT.

As known to persons of ordinary skill in the art, neutrons generated by radioactive materials of interest have a range of energies, and that the efficiency of neutron interaction in the detector will generally increase markedly as the energy of the interacting neutron decreases. For this reason, most He-3 detectors are located within a hydrogen rich moderating material, such as polythene, whose function is to promote neutron scattering of high energy neutrons such that they lose substantial amounts of energy in order to increase the probability of detection in the He-3 gas proportional counter. In the present invention, the gamma detector is advantageously designed to provide a dual function of gamma detection and neutron moderation to further improve the detection efficiency for neutrons. A plastic scintillator material is quite an efficient moderator as this feature is incorporated in the overall detector design.

Figure 5:
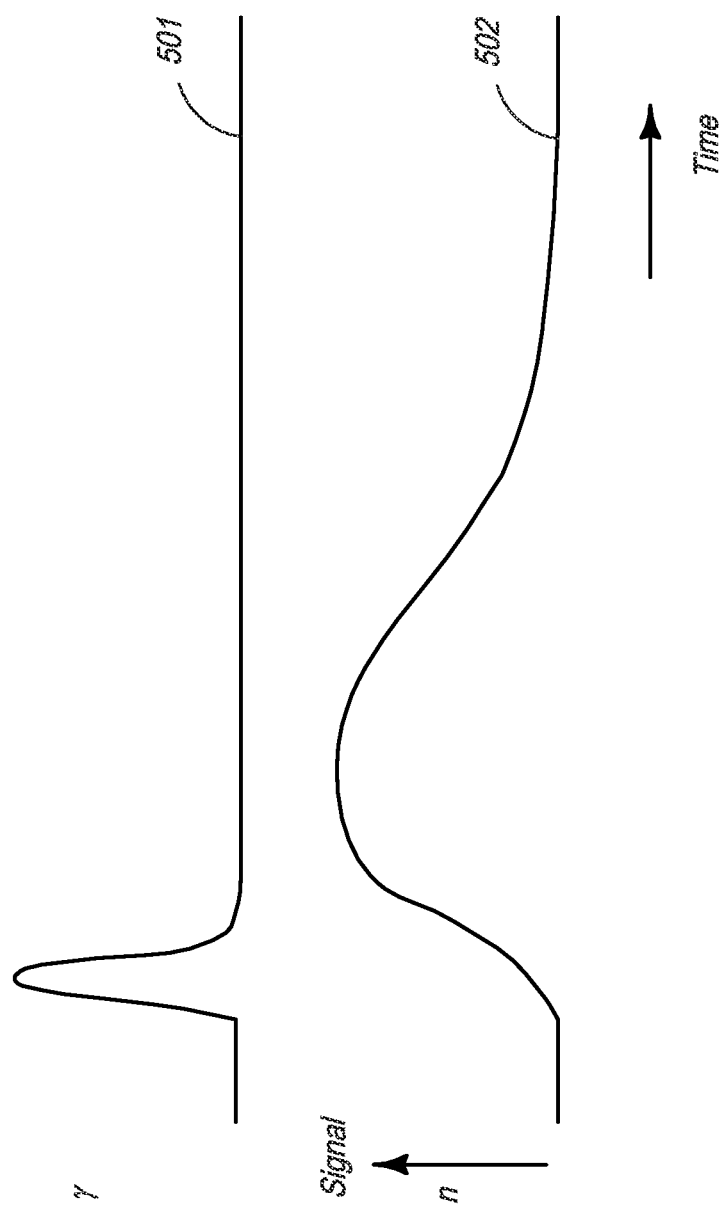
FIG. 5 illustrates pulse signals as a function of time for gamma interactions and neutron interactions, respectively.

FIG. 5 illustrates pulse signals, as a function of time corresponding to gamma interactions and neutron interactions in the composite detector of the present invention. Referring to FIG. 5, the scintillation characteristics curve 502 of the neutron sensitive scintillator is very different from the characteristics 501 of the surrounding gamma sensitive detector. These two characteristic signals 501 and 502, can be further tuned to exhibit a significant difference. This can be done by using appropriate pulse shape discrimination methods. Thus, in one embodiment of the present invention, both the total energy deposited in the detector and the types of interaction are determined. While the total energy can be determined by analysing the peak magnitude of the pulse signal, the type of interaction is determined by analysing the rate of decay of the scintillation pulse.

Figure 6:
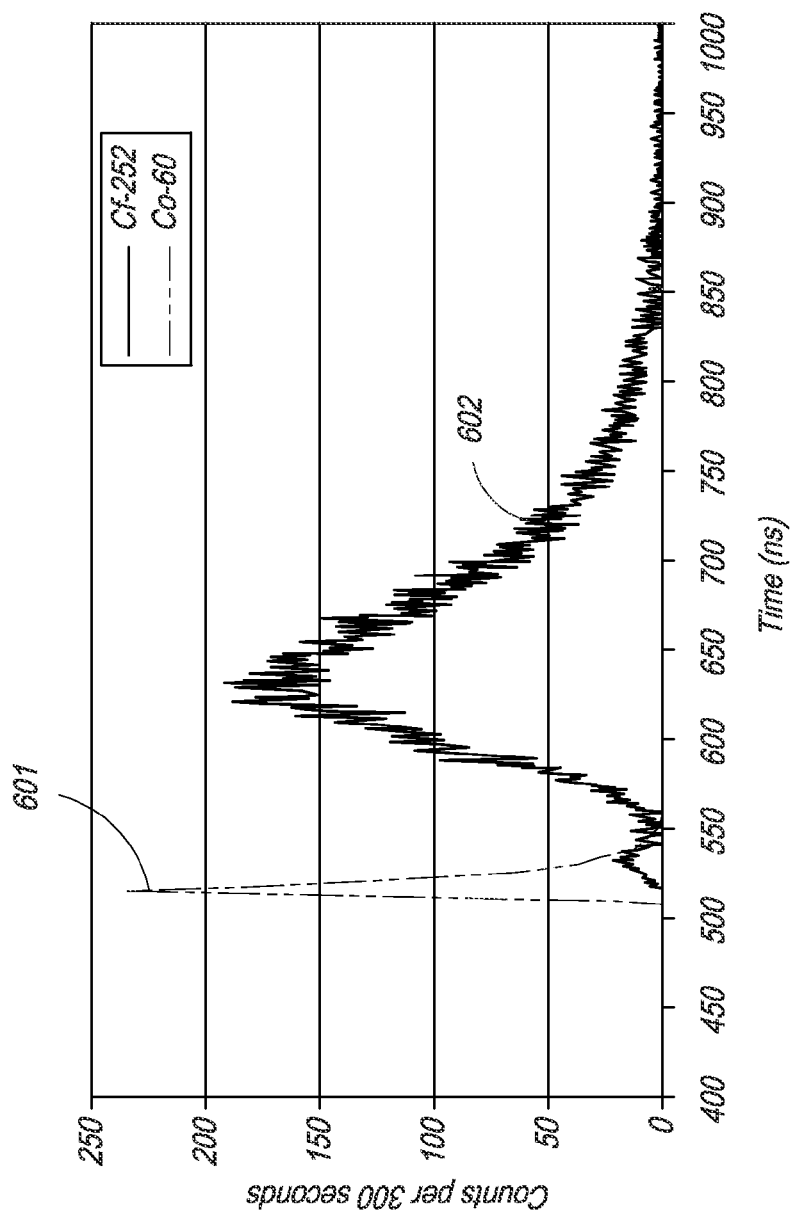
FIG. 6 illustrates discrimination between gamma ray and neutron measurement signals.

FIG. 6 illustrates the discrimination between gamma rays and neutrons for 252Cf and 60Co source, when analog Pulse-Shape Discrimination is applied to separate gamma rays from neutron events. While curve 601 reflects measurement of gamma rays emitted from 60Co source, curve 602 reflects measurement of neutrons emitted from 252Cf source. It would be apparent to those of ordinary skill in the art that the two curves are separate and distinctly identifiable.

In one embodiment, the gamma-ray rejection is improved by subtracting a calibrated fraction of gamma-ray counts from the measured neutron counts.

In one embodiment, the digital pulse processing is advantageously performed directly at the output of the detector. Since data rates can be quite high, processing at the detector helps filter the data down to a low bandwidth for transmission on to other processing systems. This data can be used to monitor the amount of radioactivity that is detected and to raise suitable alarms and/or display data by a number of means.

In yet another aspect of this invention, it is noted that the neutron reaction may also create an associated gamma-ray emission. For example in the reaction of a neutron with Gd-157, the excited Gd-158 nucleus decays with the emission of a gamma-ray. This gamma-ray is produced within a finite time of the neutron interaction and, therefore, it is possible to include the gamma-ray response that is measured in the surrounding gamma-detector in combination with the neutron scintillator response to produce a combined signal using the principle of pulse shape discrimination and time domain correlation.

Figure 7:
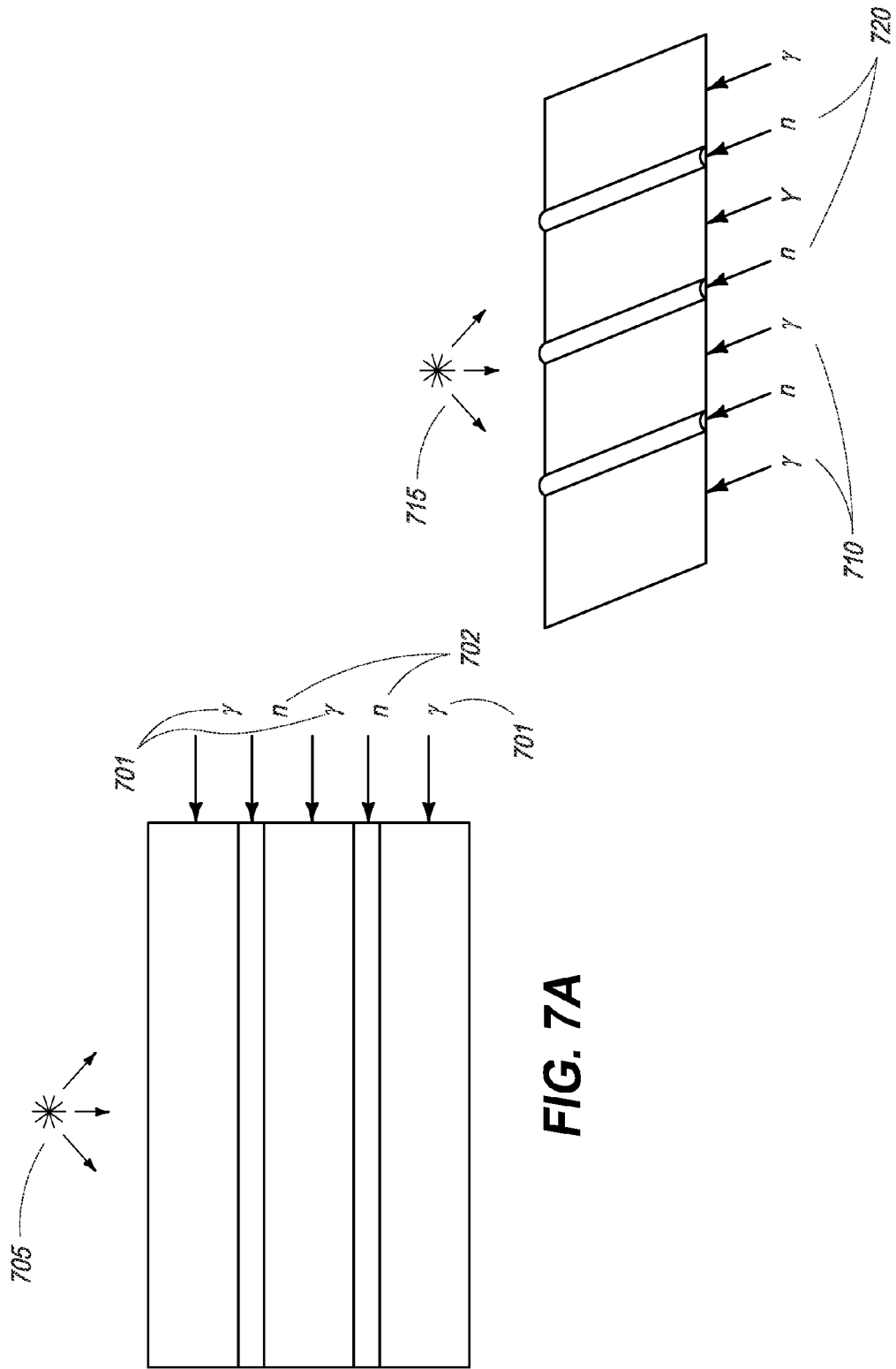
FIG. 7A illustrates one embodiment of the detector of present invention with multiple layers of gamma and neutron detector materials to increase neutron sensitivity.
FIG. 7B illustrates another embodiment of the detector of present invention with angled detector slabs to increase neutron detection efficiency.

While FIG. 1C illustrates an exemplary configuration for a composite detector, alternative detector configurations may be established in order to further enhance neutron and gamma detection efficiency. Two exemplary alternative configurations are illustrated in FIGS. 7A and 7B. As shown in FIG. 7A, a first configuration combines multiple layers of gamma sensitive scintillator slabs 701 and neutron sensitive scintillator slabs 702 placed alternately with each other, in a direction substantially perpendicular to the direction of arrival of incident radiation 705. In this configuration, the efficiency of the gamma-neutron detector scales in proportion to the number of slabs of detector material; although this is a diminishing effect due to preferential absorption of radiation in the first layers of the detector compared to the later layers of the detector. Neutron sensitivity is significantly enhanced when the detector slabs are arranged in this configuration.

In another configuration shown in FIG. 7B, multiple layers of gamma detector materials 710 and neutron detector materials 720 are placed alternately with each other and are oriented at an angle to the direction of the incoming radiation 715. That is, layers 710 and 720 are not parallel to the direction of the incoming radiation 715. Such a detector configuration with angled detector slabs significantly increases neutron detection efficiency. This is because a neutron or photon in this case has a longer path length through each detector slab, which contributes to detection efficiency, as compared to the arrangement of slabs shown in FIG. 7A. However, this arrangement of detectors is also more expensive to fabricate and requires more extensive readout circuits.

One of ordinary skill in the art would appreciate that other configurations of scintillator materials and photo-detectors are possible, and any configuration may be selected depending upon its suitability to the application. Therefore, the composite gamma-neutron detector of the present invention described with reference to FIGS. 1, 7A and 7B is not limited to plastic scintillator gamma detector with Li-6/ZnS neutron detector. In one embodiment for example, the composite detector may be configured using NaI(Tl) as the gamma detector, along with a lithium, boron or gadolinium based liquid scintillator with a very fast decay time. Here, the NaI (Tl) gamma detector will provide significant pulse height information about the gamma ray interaction while the neutron detector will continue to provide information about the incident neutron flux.

It shall be appreciated that the use of light reflective coatings with suitable optical coupling materials will improve overall light collection efficiency and hence the uniformity of response of the detector. It should also be understood that optical light guides and shaping of the scintillator materials may also be used to improve light collection efficiency of the detection system. Further, it should also be understood that the addition of radiation shielding materials such as lead, polythene and cadmium foil around the scintillation materials may be used to reduce the response of the detection system to naturally occurring background radiation.

In a further embodiment of the invention, a neutron scintillator can be used which provides different pulse shapes due to fast and thermal neutron interactions, where each pulse shape is different to that selected for the gamma detector.

Figure 8:
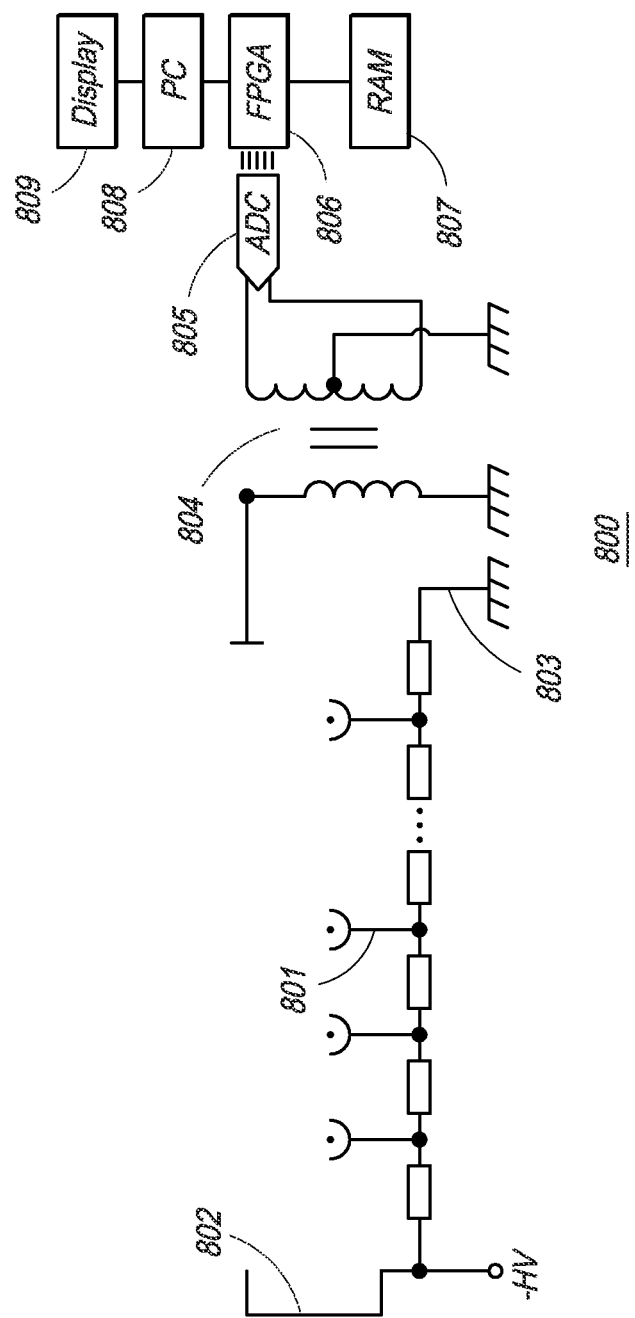
FIG. 8 illustrates an exemplary readout circuit used with the detection system of the present invention.

FIG. 8 illustrates an exemplary detector readout circuit architecture. Referring to FIG. 8, the circuit 800 comprises a photomultiplier tube (PMT) 801, which is operated with its cathode 802 held at negative high voltage with a grounded anode 803. The anode 803 is AC coupled using a transformer 804 to a high speed sampling analogue-to-digital converter (ADC) 805. The ADC 805 forms a time domain sample of the incoming signal from the PMT 801. In one embodiment, the ADC operates at a clock speed of 100 MHz or more to provide at most 10 ns sampling periods for accurate measurement of peak height and of the rise and fall decay times. In one embodiment, a filtering circuit is advantageously included between the PMT 801 and the input to the ADC 805 to act as a Nyquist filter to prevent unwanted aliasing in the sampled data. In one embodiment, an LCR multi-pole filter is implemented using the AC coupling transformer 804 as the inductive component.

In an alternate configuration, the PMT 801 may be d.c. coupled to the input of the ADC 805 using a high bandwidth analogue amplifier. A variety of other circuit configurations will be apparent to one skilled in the art.

The digital data produced by the ADC is advantageously passed directly to a digital processing circuit, such as a field programmable gate array (FPGA) 806. The FPGA provides high speed digital pulse shape processing and is configured to (1) record the time of arrival of a pulse, (2) determine the magnitude of the pulse and (3) determine the fall time of the pulse in order to discriminate between neutron and gamma interactions. This pulse-by-pulse data is histogrammed to a random access memory 807 and can subsequently be analysed by a software program running on a computer 808 to resolve detected count rates relative to a dynamically adjusted baseline. The result may be indicated to an operator through a visual display screen 809, a visual indicator, an audible sounder or any other suitable device in order to signal when a radioactive substance has been detected.

A variety of other methods to provide pulse-shape discrimination will be apparent to those of ordinary skill in the art.

Figure 9:
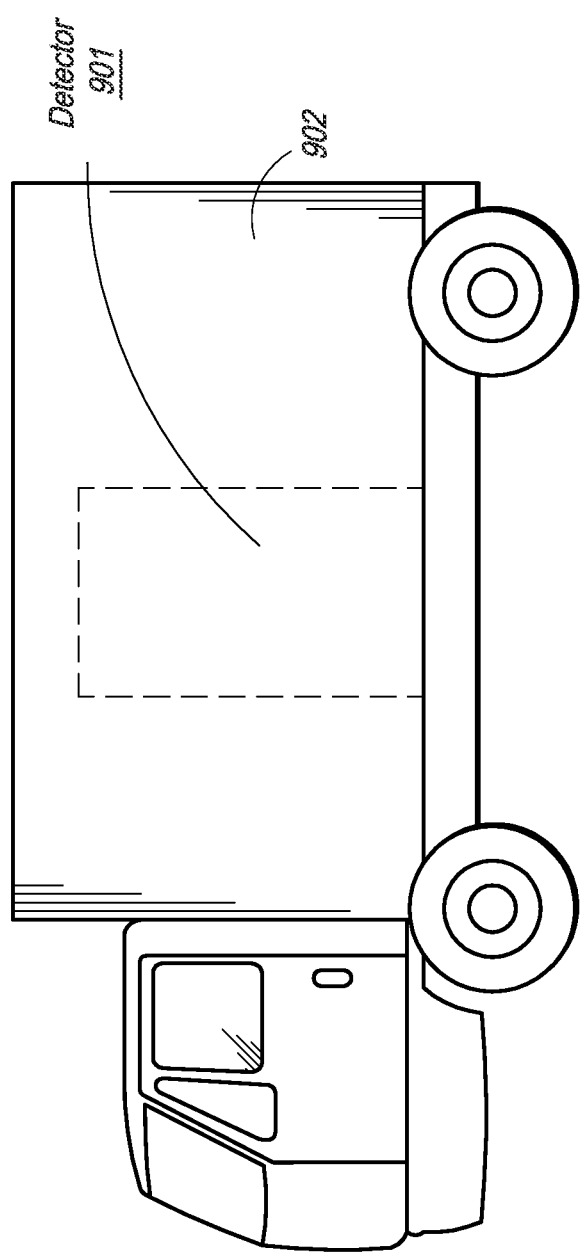
FIG. 9 illustrates an exemplary application of the gamma-neutron detector of the present invention in a drive-by vehicle.

FIG. 9 shows an application of a composite gamma-neutron detector in a mobile system, in a drive-by scanning configuration. Referring to FIG. 9, the gamma-neutron detector 901 is positioned in a vehicle 902. This configuration allows rapid re-location of the detector 901 from one site to another, and is also useful for covert scanning of vehicles as they pass along a road. In this embodiment, the vehicle 902 is driven to a location, such as a roadside, and the detection system 901 is activated. In one embodiment, one or more sensors (not shown) that are located on the vehicle 902 determine the presence of a passing object to be scanned, such as a passing vehicle, and the detection system 901 is turned on automatically. Once the vehicle has been scanned, the gamma-neutron detector 901 is turned off automatically. Once scanning at a given location is completed, the vehicle 902 can simply be driven to a new location and scanning can recommence as required. This feature provides the capability for random location scanning in a reasonably covert manner.

When not actively scanning a vehicle at the scanning site, the gamma-neutron detector in its off state is used to record the natural background radiation and this natural background rate is used to set an appropriate alarm threshold for when additional activity is detected in a passing vehicle during the on state of the scanner.

In another application, the composite gamma-neutron detector 901 is installed in a vehicle 902 that can be driven past stationary targets at a known velocity. As the vehicle 902 drives by, radiation emission data is collected in order to determine the presence of radioactive materials in the stationary object.

Figure 10:
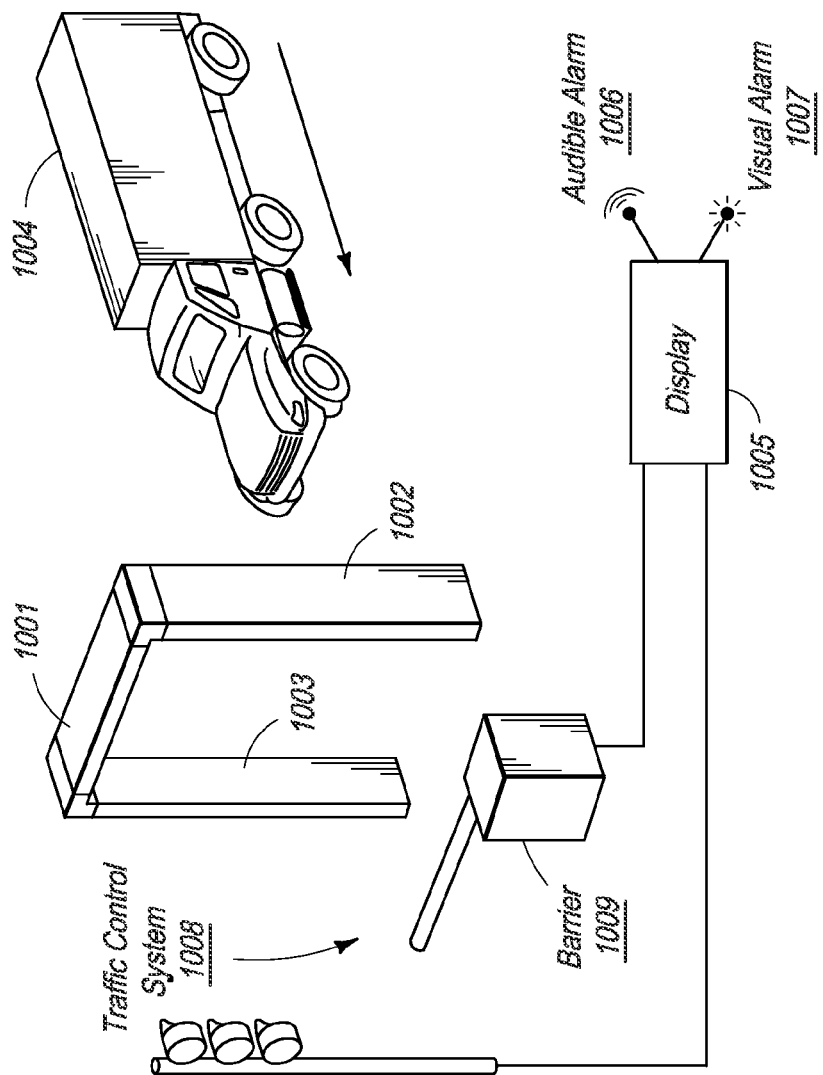
FIG. 10 illustrates another exemplary application of gamma-neutron detectors in a drive-thru scanning configuration.

FIG. 10 shows another application of one or more composite gamma-neutron detectors in a drive-through scanning configuration. Referring to FIG. 10, a plurality of composite gamma neutron detectors 1001, 1002 and 1003 are arranged as a fixed drive through system, in a portal configuration having a right, left, and top side, through which cargo vehicles such as 1004 can be driven. The signals from the detectors 1001, 1002 and 1003 are processed and the result can be seen on a display 1005. The display is also coupled to audible 1006 and visual 1007 alarms which are automatically generated, when radioactive material is suspected on the vehicle 1004 being scanned. The result on display 1005 and the alarms 1006 and 1007 may be used to determine if the vehicle 1004 needs further search, and the vehicle may be diverted to a holding area, for example, for a manual search. The drive through scanning system of FIG. 10 also employs a traffic control system 1008, which operates a barrier 1009 for stopping the vehicles for inspection. The barrier is lifted automatically once the scan results appear on the display 1005.

In an alternative configuration, one or more gamma-neutron detectors of the present invention are installed with a baggage handling system employed at airports. In this manner, the system of present invention may also be used for detection of radioactive materials in baggage passing through an airport terminal. In another alternative configuration, one or more gamma detectors of the present invention can be installed in air cargo facilities and at the entrance of scrap metal facilities.

Figure 11:
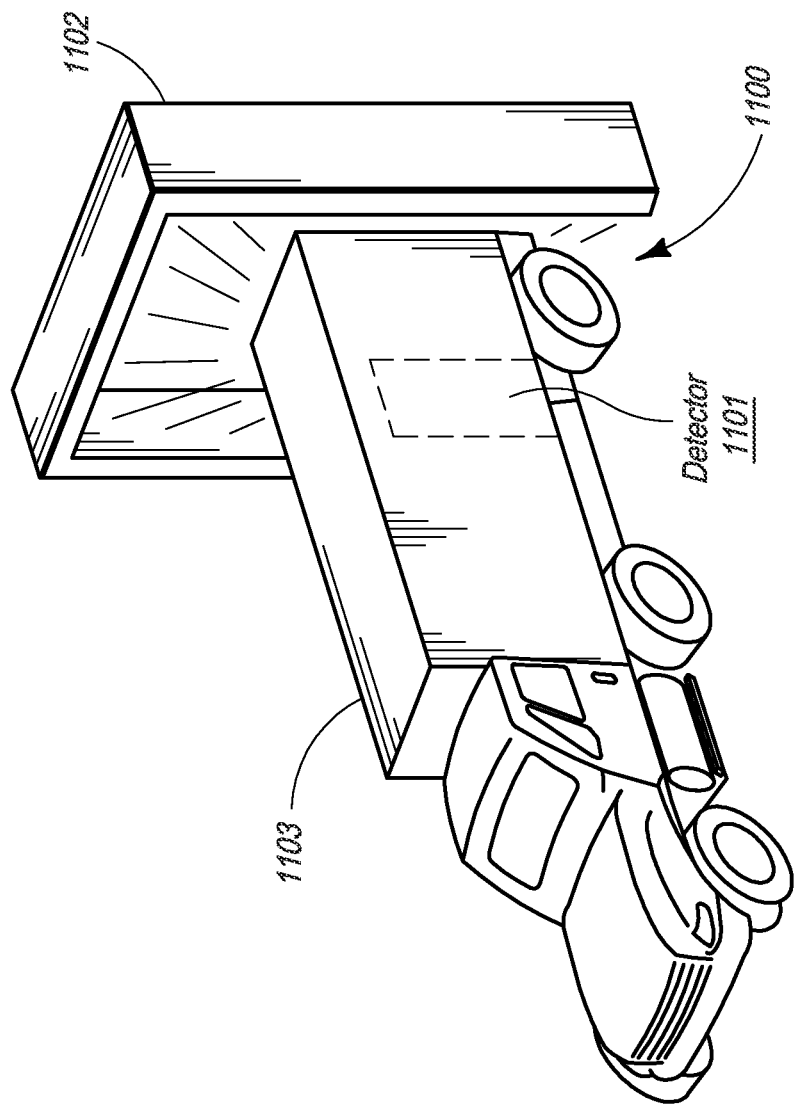
FIG. 11 illustrates yet another exemplary application of the gamma-neutron detector combined with a mobile X-ray scanner for generating composite gamma-neutron X-ray images.

In a further embodiment of the present invention, a gamma-neutron detector is combined with a mobile X-ray scanner for generating composite gamma-neutron X-ray images. This is illustrated in FIG. 11. Referring to FIG. 11, a gamma-neutron detector 1101 is installed on a mobile X-ray scanner 1100. The mobile X-ray scanner 1100 further comprises an X-ray scanning system 1102 mounted on a vehicle 1103. In this case, the radioactive signal from the gamma-neutron detector 1101 is acquired simultaneously with a transmission X-ray image from the X-ray scanning system 1102. This allows signals from the gamma-neutron detector 1101 to be correlated with the X-ray image data to help the operator locate the presence of a radioactive material within the load under inspection. Any of the mobile systems disclosed in U.S. patent application Ser. Nos. 10/201,503; 10/600,629; 10/915,687; 10/939,986; 11/198,919; 11/622,560; 11/744,411; 12/051,910; 12/263,160; 12/339,481; 12/339,591; 12/349,534; 12/395,760; and 12/404,913, all of which are incorporated herein by reference, can be used.

Figure 12:
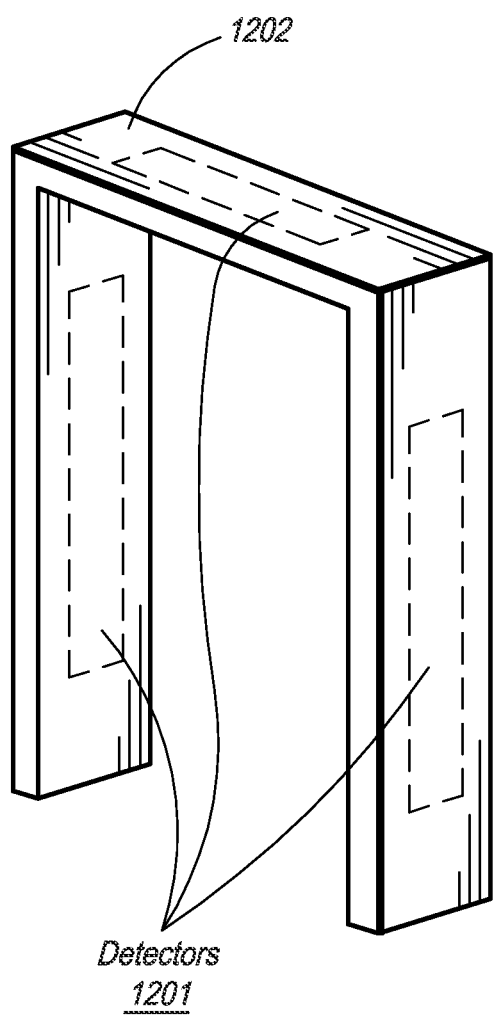
FIG. 12 illustrates another embodiment of the combined gamma-neutron detector and based X-ray imaging system in a portal or gantry configuration.

In yet another embodiment, the gamma-neutron detector of the present invention is combined with an X-ray imaging system, in a portal or gantry configuration. Referring to FIG. 12, a plurality of gamma-neutron detectors 1201 are co-located with a transmission X-ray system 1202 arranged in a portal configuration. Objects or vehicles under inspection can be passed through this portal or gantry. This mode of operation again allows the radioactive signals to be correlated with an X-ray image of the object under inspection thereby increasing detection efficiency. For example, the occurrence of a high-attenuation area observed in the X-ray image and a small increase in gamma-ray and/or neutron signal below the threshold could indicate the presence of a shielded radioactive source.

Figure 13:
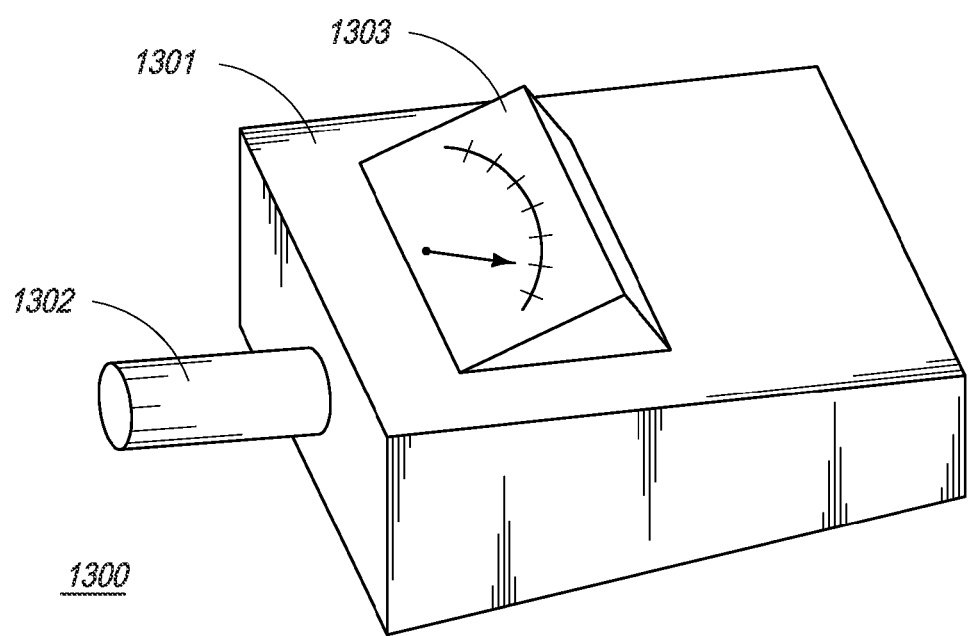
FIG. 13 illustrates the gamma-neutron detector in a portable configuration, according to one embodiment of the present invention.

FIG. 13 shows another embodiment of a gamma-neutron detector in a portable, hand-held configuration. Referring to FIG. 13, a gamma-neutron detection instrument 1300 is shown. The instrument comprises a main unit 1301 and a handle 1302. In one embodiment, the scintillation panels of the composite gamma-neutron detector (not shown) are located in the main unit 1301, while the electronics and battery are advantageously located in the handle 1302 of the instrument. An embedded indicator 1303 provides feedback to the operator on the amount of radiation present in the vicinity of the instrument 1300. This configuration is very useful for random searching, especially small objects and in searching nooks and corners within a vehicle.

The novel approach of the present invention combines a neutron scintillation detector with a gamma detector to form a hybrid gamma-neutron detector. This approach provides the advantage of detecting dual signatures, thereby increasing detection efficiency. Further, by using the method of pulse shape discrimination, the system of present invention also provides an excellent separation of the neutron signal from the gamma signal. The system of present invention may be used in various configurations, depending upon the application, including but not limited to, fixed, drive-through portal, gantry, portable and hand-held. The combined detector can be used for sea cargo inspection, and vehicle inspection in land crossings and scrap-metal facilities, in baggage and air cargo scanning, and other applications. The combined neutron-gamma detector of the present invention and/or the neutron detector portion and/or the gamma detector portion is further designed to meet ANSI standards for radiation detection.

Compared to He-3 based systems, which face a problem due to short supply of He-3, the present invention does not limit the use of the system with a particular nucleus. As mentioned previously, any suitable material with high neutron thermal capture cross-section with emission of particles, such as Lithium (Li-6), Boron (B-10), Cadmium (Cd), Gadolinium (Gd), and Helium (3-He) may be used for radioactive material detection with the system of present invention. This feature helps to keep cost and supply under control. Further, the combined gamma-neutron detector of the present invention is more compact and lighter as compared to He-3 based systems, as the detector of present invention only uses, in one embodiment, one set of electronics whereas He-3 based systems multiple sets of electronics are employed. It should be noted herein that in other embodiments, the present invention may be used with a plurality of electronic sets.

Most Radiation Portal Monitors (RPM) deployed around the world employ plastic scintillators to detect gamma rays and moderated $^3$He detectors to measure neutrons. It is important to note that in typical RPMs, only one or two $^3$He tubes are used per module with a suboptimal moderating configuration to reduce cost. This results in a neutron detection efficiency of few percent.

The proposed neutron detector can replace $^3$He detectors in Radiation Portal Monitors (RPMs) as its neutron detection and gamma-ray rejection capabilities are similar to that of $^3$He. Further, the detectors of present invention do not contain hazardous materials, are commercially available, do not require special transport permits, are very rugged—mechanically as well as environmentally, and are easy to manufacture at a reasonable cost. The detectors are also suitable for handheld and backpack detectors, where efficiencies exceed that of $^3$He. Finally, the present approach is suitable for integrated neutron and gamma-ray detectors, as it employs a single PMT with relatively simple and compact electronics.

As mentioned above, $^{10}$B, like $^3$He, has a high thermal neutron capture cross-section and emits two detectable high energy charged particles, but unlike $^3$He, is naturally abundant. On the other hand, the supply of $^3$He is rapidly dwindling and as a result, $^3$He gas has become extremely expensive and difficult to obtain. Although boron coated detectors have been available in the past and for example, utilized as reactor neutron flux monitors, they were inefficient, limiting their usage.

The present specification, therefore, describes in one embodiment, a thinly-coated $^{10}$B flat-panel ionization chamber neutron detector, which can be deployed as a direct drop-in replacement for current Radiation Portal Monitor (RPM) $^3$He detectors. In various embodiments, the $^{10}$B coating has a thickness range of 0.1 to 2.0 micron. In one embodiment, the $^{10}$B coating is 1.0 micron thick. A thicker coating means the energy losses are greater from the charge particle traversing through the coating into the gas chamber. This results in a detriment to the signal. However, a thicker coating can increase detection efficiency lowering the number of layers required to reach a certain efficiency.

In one embodiment, the detector of the present specification comprises an argon gas cell sandwiched between boron-coated anode and cathode electrode plates.

In one embodiment, parallel plate geometry is employed, which allows for integration of neutron moderating sheets, such as polyethylene, on the back of the electrode plates to thermalize the neutrons and then detect them with high efficiency. Optionally, the moderator can be replaced with plastic scintillator sheets that can be viewed with a large area photomultiplier tube to detect gamma-rays in addition to neutrons, as is the case with existing RPMs.

The present specification further describes a large-area detector that is simple in its construction and manufacture, easily scalable with respect to the unit cell detector, easily adaptable to a variety of applications, and low cost.

Figure 14:
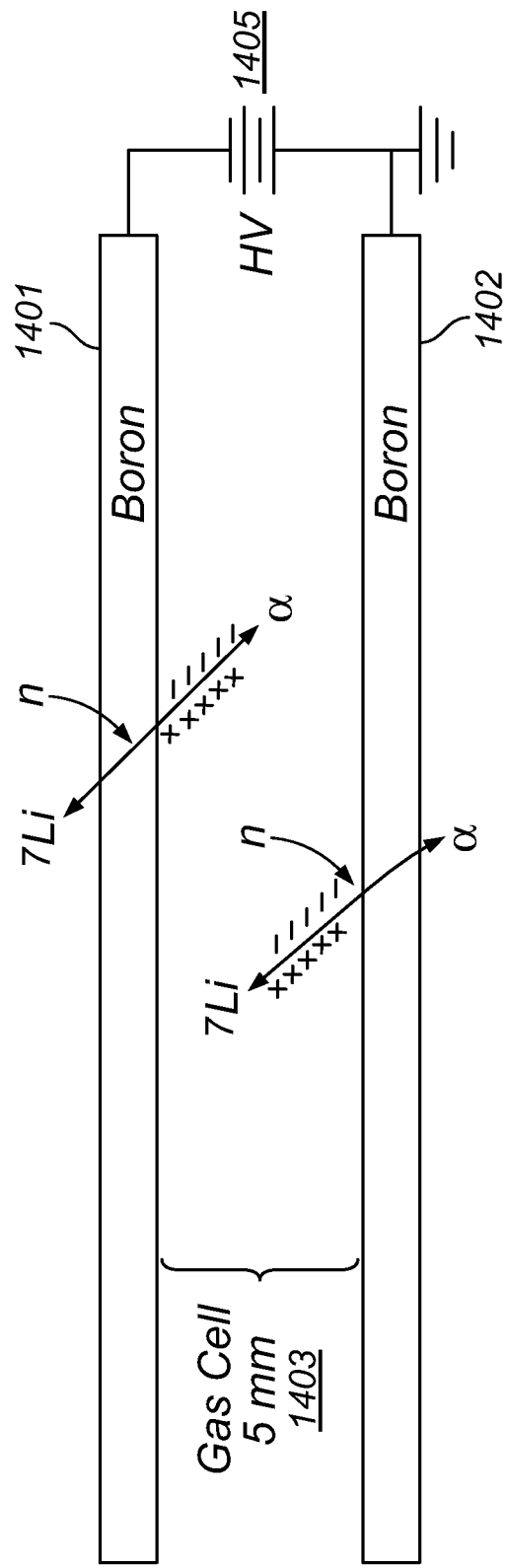
FIG. 14 illustrates a parallel plate based Boron-10 (B-10) detector, according to one embodiment of the present invention.

In one embodiment, as mentioned above, the approach in developing a large-area $^{10}$B-based $^3$He replacement detector focuses on utilizing a parallel plate ionization chamber concept, which is illustrated in FIG. 14. Referring to FIG. 14, the basic geometry of one unit cell detector consists of a first boron layer 1401 and a second boron layer 1402, which are high-voltage biased, sandwiching a gas cell 1403. The two layers of boron capture thermal neutrons. When a neutron is captured, two charged particles, $^7$Li and alpha are emitted and ionize the gas, thereby creating free ions and electrons. The voltage applied 1405 sweeps the charges creating a signal.

The following equation shows the neutron capture reaction of $^{10}$B:—

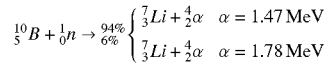

As seen in the reaction, a $^7$Li and alpha particle are emitted in opposite directions. One particle ionizes the gas in the gas cell 1403 creating free electron and ion pairs. The high-voltage bias sweeps the ions creating a signal pulse proportional to the number of electron/ion pairs created. Because the chamber does not rely on multiplication of electrons, which proportional counters utilize to increase signal, lower voltages can be applied. In 94% of the reactions, an alpha particle receives 1.47 MeV, while it receives 1.78 MeV in about 6% of the reactions.

$^{10}$B has the second highest thermal neutron capture cross-section for a low-Z material. The cross-section is 3837 barns, while $^3$He has a cross-section of 5333 barns. Because $^{10}$B has such a high thermal neutron capture cross-section, $^{10}$B-based detectors can achieve $^3$He equivalent efficiencies. The large-area parallel plate ionization chamber can not only be designed to be a pure thermal neutron detector, it can be designed and optimized to detect fast neutrons as well.

Fast neutron detection is in many cases more relevant to the inspection arena than pure thermal neutron detection efficiencies, as all neutrons, when produced, are "fast" (with energies above 0.1 MeV). Indeed fast fission neutrons are one of the most important signatures of a fission event. In one embodiment, multiple unit cell detectors of FIG. 14 are stacked together to increase the intrinsic efficiency of the detector. In one embodiment, the detector is multi-layered and includes greater than 20 layers.

Figure 15B:
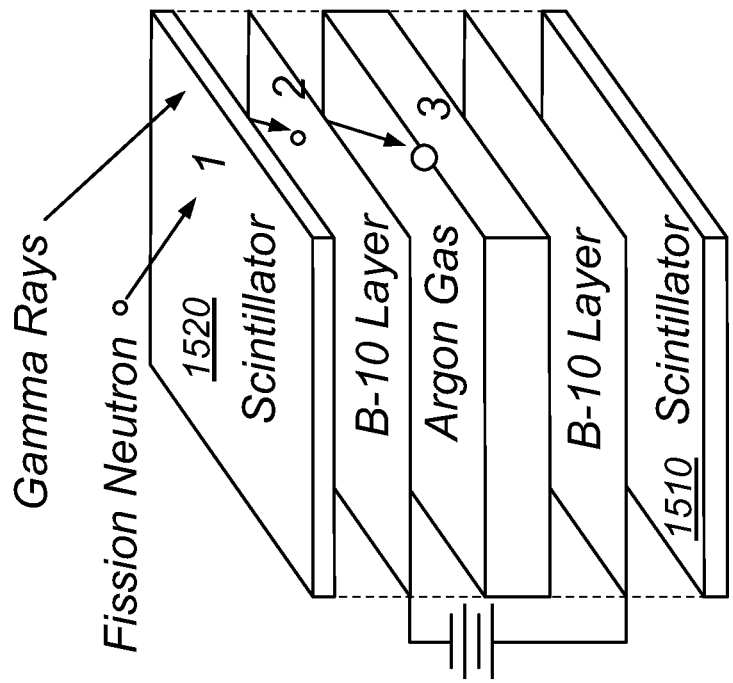
FIG. 15B illustrates a fast neutron detector geometry, in a second embodiment.
Figure 15A:
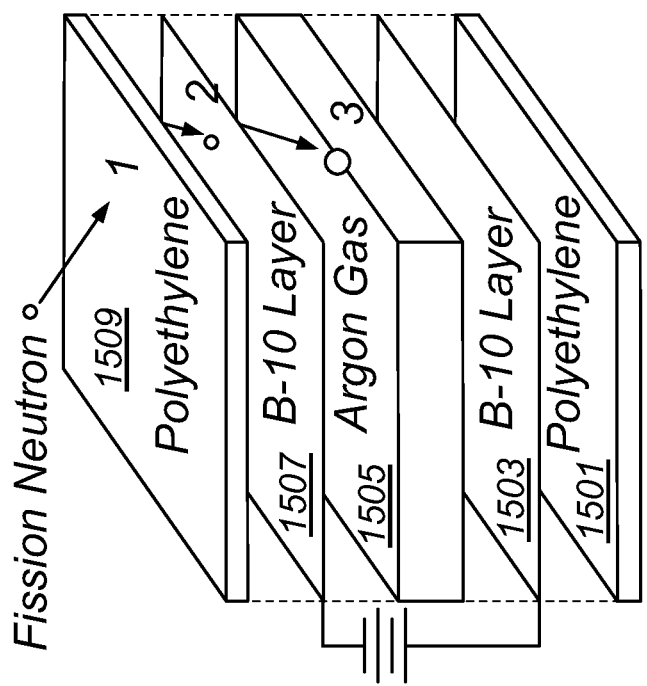
FIG. 15A illustrates a fast neutron detector geometry, in a first embodiment.

FIGS. 15A and 15B illustrate a first and second embodiment of fast neutron detector geometries, respectively, that can replace large-area Radiation Portal Monitors. Referring to FIG. 15a, a unit cell detector comprises a first polyethylene layer 1501, a first boron-coated metallic layer 1503, a gas cell layer 1505, a second boron-coated layer 1507, and a second polyethylene layer 1509. In one embodiment, gas cell layer 1505 is comprised of argon. In operation, a fast neutron gets moderated by the polyethylene layer, thermalizes, and gets captured by the boron. The polyethylene layers thus serve to moderate fast neutrons.

As shown in FIG. 15B, a photon detector is integrated with the neutron detector. Here, instead of polyethylene sheets, a plastic scintillator is integrated into the detector in the form of two layers 1510 and 1520. The plastic scintillator serves a dual purpose; it can moderate fast neutrons and can detect gamma rays as well, since it is a gamma ray scintillation detector. While the design of FIG. 15A can replace the $^3$He module in the current RPMs; the design of FIG. 15B in a single module, can replace the entire gamma ray and neutron detection modules of current RPMs.

As mentioned above, scalability of the detector to cover large areas is achievable through the parallel plate ionization chamber concept. FIGS. 16A through 16C illustrate three exemplary steps via which scalability can be achieved. FIG. 16A shows two stacked unit cell detectors 1601 described in detail with respect to FIGS. 15A and 15B. In one embodiment, the stacked detector has dimensions in the range of 10 cm×10 cm×1 cm. The stacked detector, which comprises two unit cell detectors 1601 comprise a total of four boron layers 1605, two argon gas cells 1607 and three kapton layers 1609. The kapton layers 1609 are used to provide rigidity to the thin boron coatings. One of ordinary skill in the art would appreciate that other suitable materials may also be used for the purpose.

By adding more boron, or stated differently, by adding more layers of boron, by stacking more than one unit cell detector, the amount of neutron absorbing material within the detector stack is increased. With more boron, there is a greater likelihood of detecting a neutron because as the neutron passes through the detector there is a greater chance that it will interact with at least one layer of boron. Thus, in one embodiment, multiple unit cell detectors are stacked together to increase the intrinsic efficiency of the detector. In one embodiment, the detector is multi-layered and includes greater than 20 layers.

FIG. 16B illustrates another embodiment of scaling the detector of the present invention. In one embodiment, unit cells are "tiled" to achieve areas of up to 1 $m^2$. Each square 1605 in the detector matrix 1606 represents one unit cell detector and by having a 10 tile×10 tile detector, large areas can be achieved. Each tile has a separate electrical line 1607 feeding into a data acquisition system. Tiles are separated by grooves 1608 for electrical insulation.

In yet another embodiment, FIG. 16C shows the detector 1610 in a foldable geometry, which allows reaching much larger areas by attaching 1 m×1 m detectors, such as those shown in FIG. 16B, folded together into a package. Folding allows for greater transportability of the detectors, which, when unfolded, achieves much larger detection areas, thereby increasing detection efficiencies.

Figure 17:
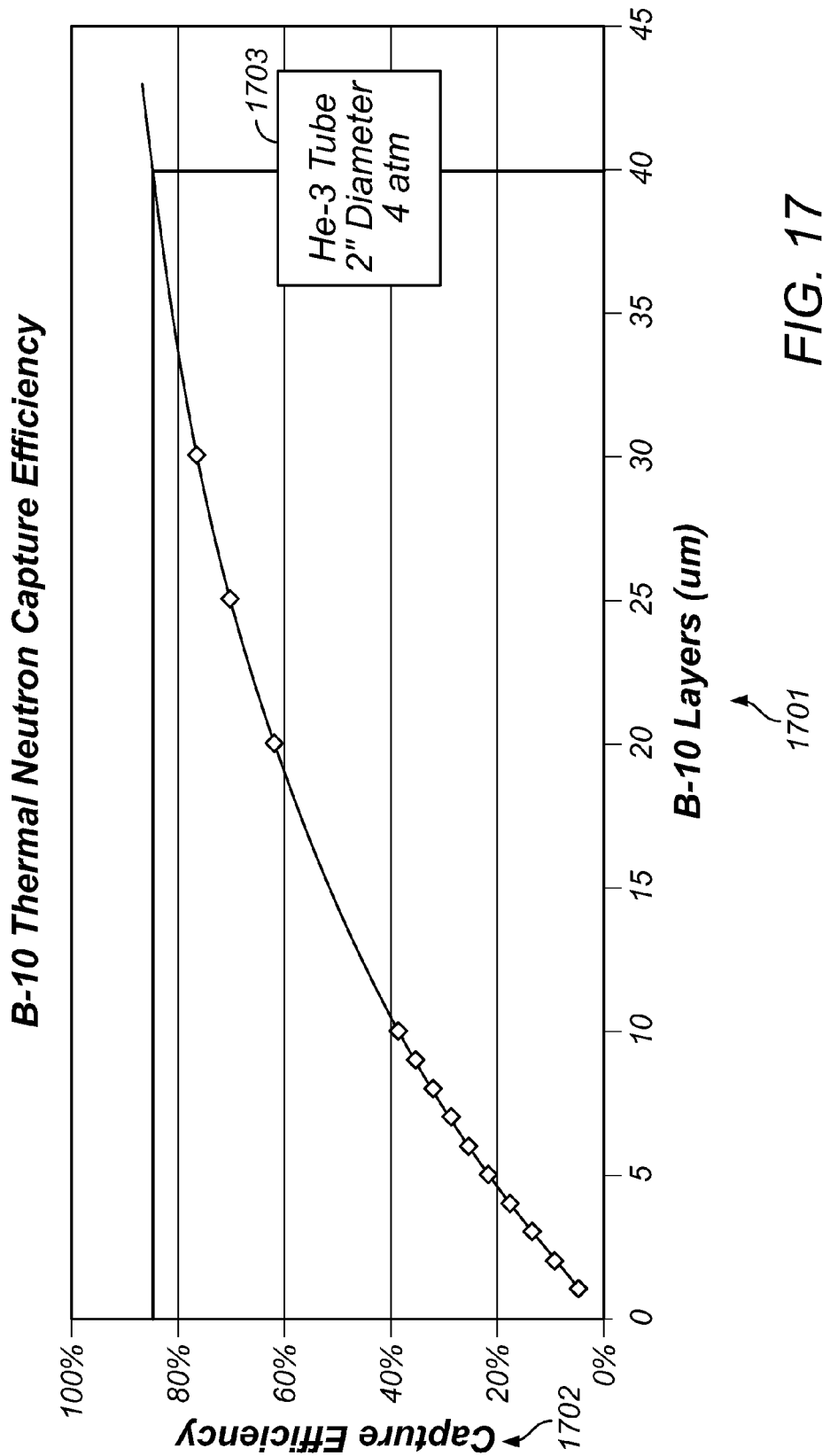
FIG. 17 is a graph illustrating detection efficiency of the B-10 detector of the present specification.

FIG. 17 illustrates the detection efficiency of the B-10 detector of the present invention by plotting the number of $^{10}$B layers 1701 required to achieve the same thermal neutron detection efficiency 1702, as that of a 2-inch diameter $^3$He tube having 4 atm pressure. In the exemplary simulation, the number of capture events for each layer of 1-μm thick $^{10}$B is calculated. This thickness was chosen because the 1.47 MeV alpha particle range in boron metal is around 3.5 μm. If the layer of boron is too thick, the charged particles lose all their energy inside the layer and get lost without contributing to the signal. Referring to FIG. 17, it can be seen that 40 1-μm thick $^{10}$B layers are necessary to achieve the same thermal neutron detection efficiency as the $^3$He tube, which is around 85%, as shown by the line 1703.

Figure 18:
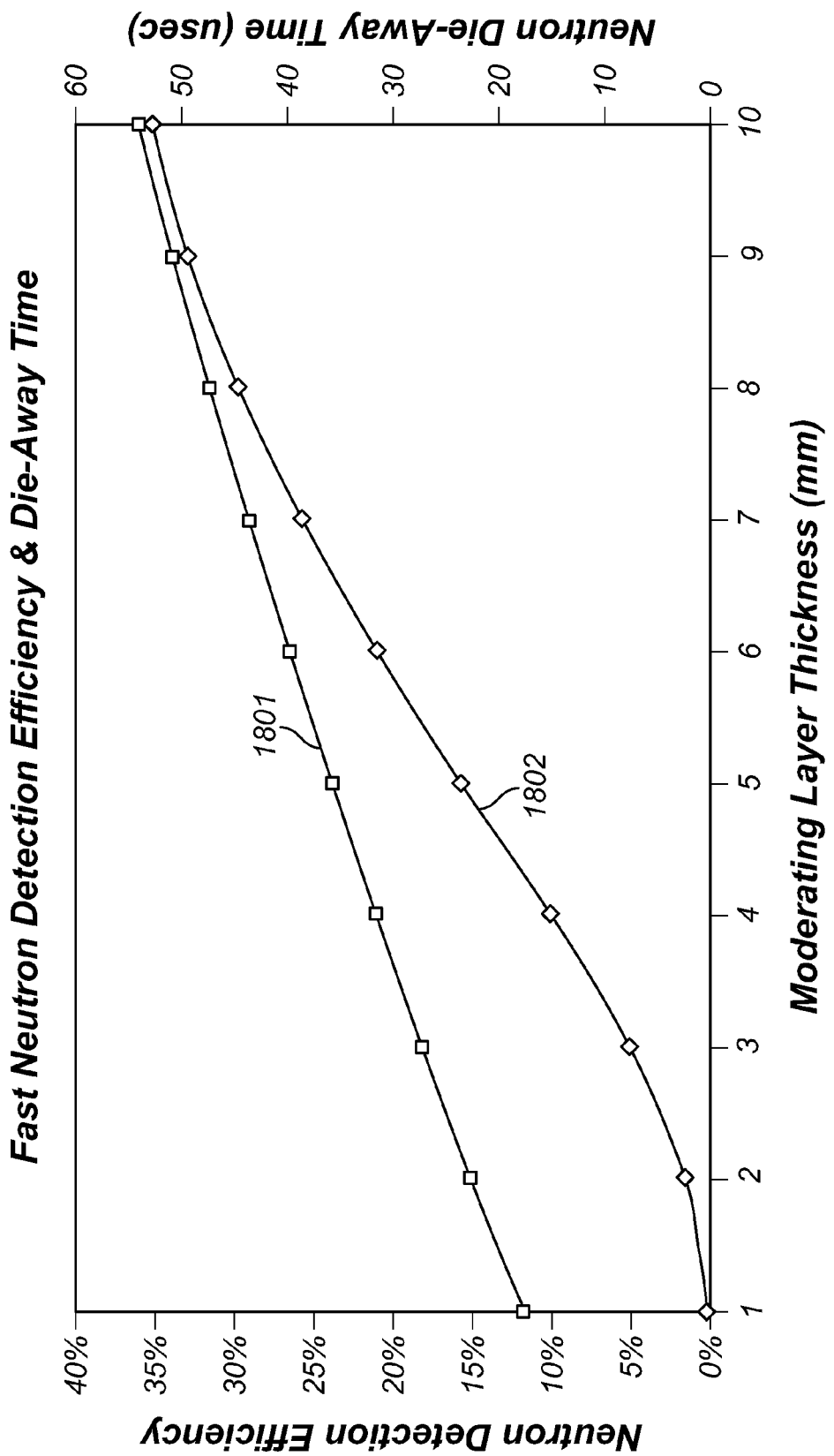
FIG. 18 is a graph showing the fast neutron detection efficiency of the $^{10}B$ neutron detector of the present specification compared with a $^{3}He$-based Differential Die-Away Analysis (DDAA) detector.

The large-area $^{10}$B thermal neutron detector can also be a good fast neutron detector. In many active interrogation techniques, it is the detection of fast neutrons that indicate hidden special nuclear materials. FIG. 18 compares the fast neutron detection efficiency of the $^{10}$B neutron detector of the present invention to a $^3$He-based Differential Die-Away Analysis (DDAA) detector. The DDAA technique can detect the thermal neutron induced fission neutrons after the thermalized interrogating source neutrons die-away within the detector. The figure plots the die-away time 1801 of the $^{10}$B neutron detector and the detection efficiency 1802 of the detector as a function of polyethylene thickness, since polyethylene is layered inside $^{10}$B detector.

The DDAA detector achieves a die-away time of 40 μs with a detection efficiency of around 25%. That means, for the same die-away time as the DDAA detector, each polyethylene layer in the $^{10}$B neutron detector must be a thickness of 6 mm, as shown by the curve 1801. Subsequently, the intrinsic detection efficiency of the $^{10}$B neutron detector at this point is around 20%, as shown by curve 1802, which is very similar to the DDAA detector.

FIGS. 19A through 19F illustrate, in a step-wise manner, one embodiment of a fabrication procedure for a large-area boron substrate layer as used in the manufacture of the unit cell detector of the present invention, having an area of about 1 $m^2$, in one embodiment. The methods proposed follow established semiconductor techniques, which are economical and scalable.

Figure 19A:
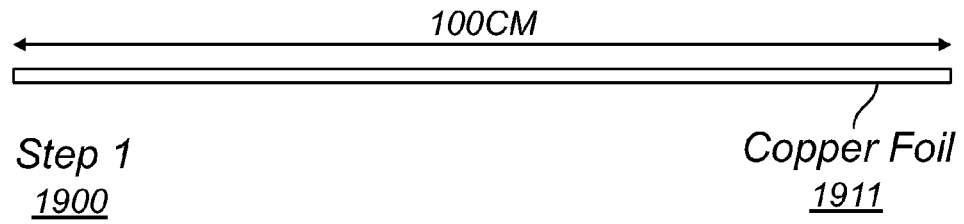
FIG. 19A illustrates a first manufacturing step for fabricating the large area boron substrate of the present specification.

As shown in FIG. 19A, in step 1900, a very thin sheet of copper foil 1911 is utilized as the metallic base for good electrical conductivity. In one embodiment, the thickness of copper foil 1911 is in the range of 50-100 μm. In one embodiment, the copper foil sheet 1901 has an area that is 100 $cm^2$.

Figure 19B:
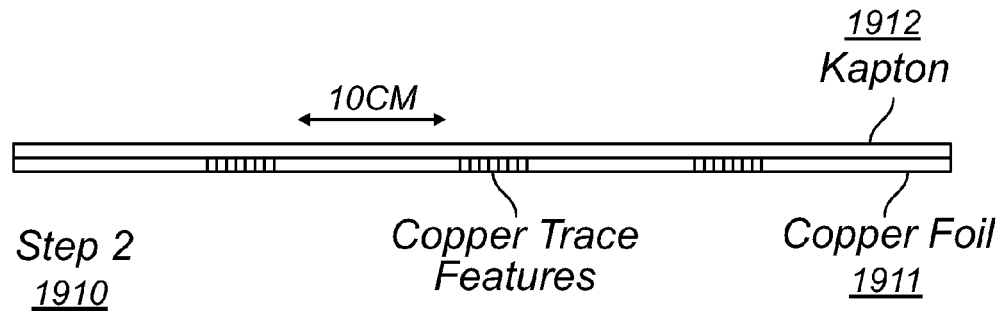
FIG. 19B illustrates a second manufacturing step for fabricating the large area boron substrate of the present specification.

As shown in FIG. 19B, in step 1910, the copper foil 1911 is attached to a more rigid layer 1912, such as a Kapton layer, which provides the large areal structural strength. The copper/Kapton layer is then immersed in a ferric-chloride solution for etching of the 10 cm×10 cm tile pattern and individual electrical lines.

Figure 19C:
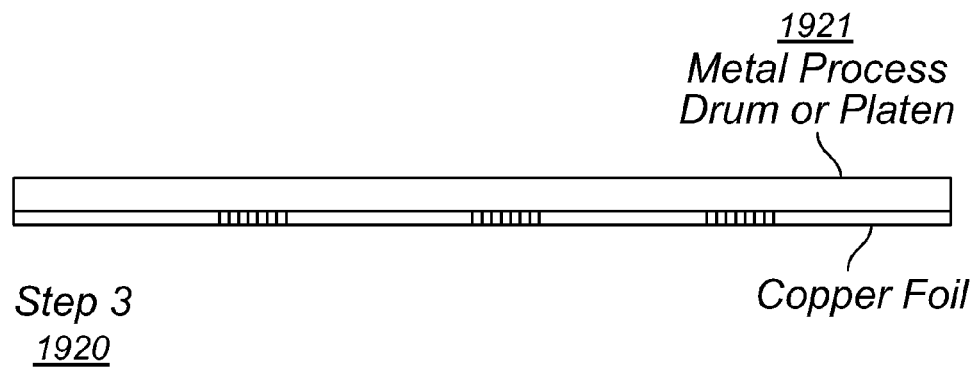
FIG. 19C illustrates a third manufacturing step for fabricating the large area boron substrate of the present specification.

Once the traces have been etched, the layer is mounted onto a drum 1921 for vacuum deposition, as shown in FIG. 19C, as step 1920.

Figure 19D:
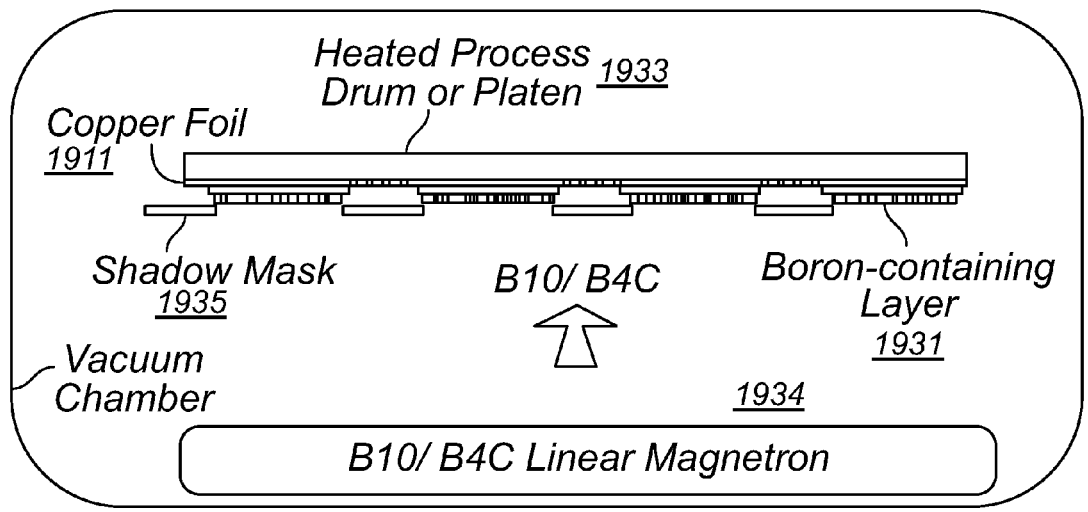
FIG. 19D illustrates a fourth manufacturing step for fabricating the large area boron substrate of the present specification.

As shown in FIG. 19D, step 1930 shows the deposition of boron 1931 onto the copper surface 1911. For deposition, the substrates attached to the drum 1933 are rotated around in a sputtering chamber (not shown). In one embodiment, the sputtering chamber comprises a magnetron 1934 for $B_{10}$C/$B_4$C sputtering. With the use of a linear sputtering source 1934, the target-to-substrate distance can be decreased and also the losses of boron in one-dimension can be constrained. Further, the rate of deposition can be increased through maximizing magnetron power densities and through scaling methods. In one embodiment, an extra electron emitter embedded within the boron target during sputtering. The use of extra electrons increases the stability and temperature of the depositions which leads to faster and more stable boron films. The method of using an extra electron emitter is described in U.S. Pat. No. 7,931,787, to Hilliard, entitled "Electron-Assisted Deposition Process and Apparatus", which is herein incorporated by reference in its entirety.

Because boron is electrically conductive, a mask 1935 is used to block the deposition of boron onto the etched electrical lines, thus keeping the lines from shorting.

Figure 19E:
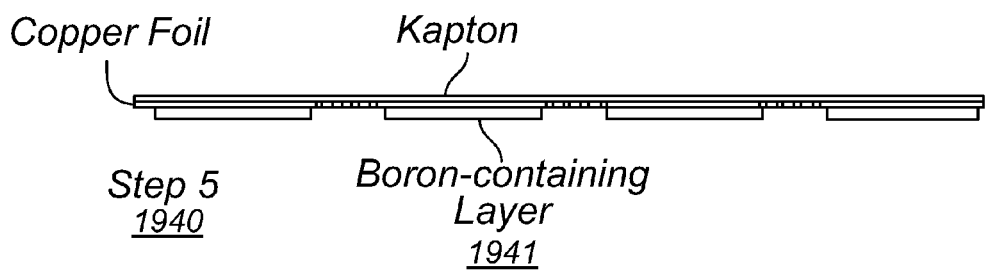
FIG. 19E illustrates a fifth manufacturing step for fabricating the large area boron substrate of the present specification.

As shown in FIG. 19E, at step 1940, after the boron has been deposited, the large-area boron layer 1941 is taken out of the vacuum and is ready for installation onto the detector.

Figure 19F:
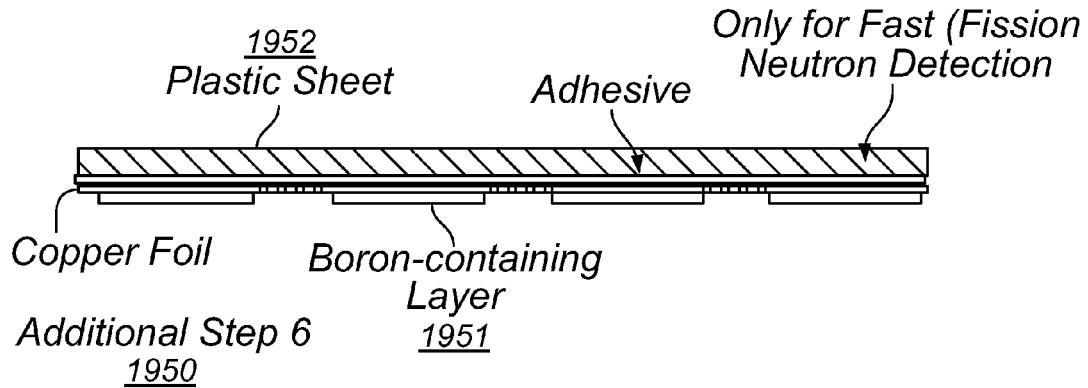
FIG. 19F illustrates a sixth manufacturing step for fabricating the large area boron substrate of the present specification.

As shown in FIG. 19f, in optional step 1950, a fast neutron detector is fabricated onto the detector, wherein the boron/copper/kapton layer 1951 is laminated onto a sheet of polyethylene 1952.

After each layer has been fabricated, each individual substrate layer, as described with respect to FIGS. 15a and 15b, are then stacked/layered into the detector, thereby increasing the amount of boron and maximizing the neutron detection efficiency.

Thus, the unit cell detector of the present invention comprises at least two boron coated metal layer sandwiching a gas cell. In one embodiment, the detector comprises a plurality of unit cell detectors, which may include a total of more than 20 layers.

For fast neutrons (fission spectrum), most of the neutrons will need to be moderated before the boron capture occurs. It should be noted that the cross section for capture increases as the neutron energy decreases. Once moderated, a neutron is absorbed or captured by the boron, which emits charged particles. Since the particles are emitted in 180 degrees, only one will traverse through the gas cell, creating detectable electrons/ions. If the first polyethylene or scintillator layer does not moderate the fast neutron, the second layer can do it, up to the nth layer, thereby increasing detection efficiency. While it is noted that a neutron can lose all of its energy on the first collision, this is not usually the case, thus necessitating the use of the entire unit cell detector in each layer of the stack, including the additional polyethylene or scintillating sheets. Therefore, as more layers are added to the stack, the probability of detecting more neutrons is increased.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A gamma-neutron detector, comprising:
a first layer of neutron sensitive composite scintillator; and
a second and a third layer of gamma sensitive scintillators, wherein the first layer is positioned between the second and third layers and wherein the second and third layers comprise plastic scintillators with a fast decay time and the first layer comprises scintillators with a slower decay time.

2. The gamma-neutron detector of claim 1, wherein the first layer comprises one of Li-6, B-10, Cd or Gd mixed with ZnS.

3. The gamma-neutron detector of claim 2, wherein the Li-6 or B-10 have a density of 20% to 30% by volume with respect to ZnS.

4. The gamma-neutron detector of claim 1, wherein the first layer is formed by vapor drying ZnS or ZnS(Ag) and one of Li-6, B-10, Cd or Gd in a mixture comprising a binder and a solvent.

5. The gamma-neutron detector of claim 1, wherein the second and third layers comprise one of an organic solid scintillator, an inorganic solid scintillator, or a liquid scintillator.

6. The gamma-neutron detector of claim 1, wherein the second and third layers are thicker than the first layer.

7. The gamma-neutron detector of claim 6, wherein the thickness of the second and third layers ranges between 0.01 m to 0.20 m.

8. The gamma-neutron detector of claim 1, wherein a plurality of the said gamma sensitive scintillators and a plurality of the said neutron sensitive composite scintillators are placed alternately with each other in a direction substantially perpendicular to the direction of incident radiation.

9. The gamma-neutron detector of claim 1, wherein a plurality of the said gamma sensitive scintillators and a plurality of the said neutron sensitive composite scintillators are placed alternately with each other and are oriented at an angle to the direction of incident radiation.

10. A gamma-neutron detector, comprising:
a first layer of neutron sensitive composite scintillator; and
a second and a third layer of gamma sensitive scintillators, wherein the first layer is positioned between the second and third layers and wherein the second and third layers respectively form front and back panels of different thicknesses.

11. A gamma-neutron detector, comprising:
a gamma detector of plastic scintillator;
a neutron detector having at least one screen comprising a mixture of silver activated ZnS and one of Li-6 or B-10;
at least one photodetector to collect and convert light produced by the neutron and gamma detectors, respectively, into neutron and gamma events; and
a reflector foil positioned between the at least one screen and the plastic scintillator, wherein the at least one screen is embedded in a transparent hydrogenous light guide.

12. The gamma-neutron detector of claim 11, further comprising a Pulse-Shape Discriminator to discriminate the neutron and gamma events; and wherein the at least one screen is embedded within the plastic scintillator.

13. A detector comprising at least one neutron cell, the said at least one neutron cell comprising:
a first and a second layer comprising B-10 for capturing neutrons; and
a cell layer, comprising gas, positioned between the first and second layers, wherein, when a neutron is captured, the first and second layers emit charged particles that ionize the gas in the cell layer creating free electron and ion pairs.

14. The detector of claim 13, wherein the gas is Argon.

15. The detector of claim 13, wherein the at least one neutron cell further comprises a third and a fourth layer of polyethylene positioned to have the first and the second layer between them.

16. The detector of claim 13, wherein a plurality of neutron unit cells are stacked together, thereby increasing the efficiency of the composite detector.

17. The detector of claim 13, wherein a plurality of neutron unit cells are tiled together, thereby increasing the area and efficiency of the composite detector.

18. The detector of claim 13, wherein a plurality of neutron unit cells are held together in a foldable geometry.

* * * * *